(12) United States Patent
Wu et al.

(10) Patent No.: US 12,342,110 B2
(45) Date of Patent: Jun. 24, 2025

(54) COMMUNICATION METHOD BASED ON PASSIVE OPTICAL NETWORK, RELATED DEVICE, AND SYSTEM

(71) Applicant: Huawei Technologies Co., Ltd., Shenzhen (CN)

(72) Inventors: Xuming Wu, Wuhan (CN); Dekun Liu, Wuhan (CN); Shiwei Nie, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 459 days.

(21) Appl. No.: 17/730,668

(22) Filed: Apr. 27, 2022

(65) Prior Publication Data

US 2022/0256264 A1 Aug. 11, 2022

Related U.S. Application Data

(63) Continuation of application No. PCT/CN2020/111023, filed on Aug. 25, 2020.

(30) Foreign Application Priority Data

Oct. 28, 2019 (CN) .......................... 201911032482.8

(51) Int. Cl.
*H04B 10/00* (2013.01)
*H04J 14/02* (2006.01)
(Continued)

(52) U.S. Cl.
CPC ...... *H04Q 11/0067* (2013.01); *H04J 14/0282* (2013.01); *H04Q 11/0062* (2013.01);
(Continued)

(58) Field of Classification Search
CPC ............... H04J 14/0235; H04J 14/0236; H04J 14/0241; H04J 14/0242; H04J 14/0249; H04J 14/025; H04J 14/0252
See application file for complete search history.

(56) References Cited

U.S. PATENT DOCUMENTS

| 7,564,852 B2 | 7/2009 | Das et al. |
| 10,027,405 B2 | 7/2018 | Geng et al. |

(Continued)

FOREIGN PATENT DOCUMENTS

| CN | 101621452 A | 1/2010 |
| CN | 101742365 A | 6/2010 |

(Continued)

OTHER PUBLICATIONS

McGarry, M.P. et al., "An Evolutionary WDM Upgrade for EPONs," XP055115813, Retrieved from the Internet:URL: http://mre.faculty.asu.edu/EPONupgrade.pdf, retrieved on Apr. 29, 2014, 24 pages.

*Primary Examiner* — Daniel G Dobson
(74) *Attorney, Agent, or Firm* — SLATER MATSIL, LLP

(57) ABSTRACT

A communication method, a device, and a system, the method including sending, by an optical line terminal (OLT) of a passive optical network that comprises the OLT and a plurality of optical network units (ONUs), a first downstream frame to the activated ONU using at least one downstream wavelength path, where the OLT and the at least one ONU of the plurality of ONUs communicate with each other using at the least one downstream wavelength path and a plurality of upstream wavelength paths, the plurality of ONUs comprises an activated ONU, wherein the first downstream frame comprises a first path identifier used to identify a first upstream wavelength path, and the first upstream wavelength path is one of the plurality of upstream wavelength paths, and receiving, by the OLT, upstream service data from the activated ONU using the first upstream wavelength path.

20 Claims, 12 Drawing Sheets

(51) Int. Cl.
*H04Q 11/00* (2006.01)
*H04J 14/00* (2006.01)

(52) U.S. Cl.
CPC ............... *H04Q 2011/0064* (2013.01); *H04Q 2011/0079* (2013.01)

(56) References Cited

U.S. PATENT DOCUMENTS

| | | |
|---|---|---|
| 10,419,150 B2 | 9/2019 | Wen et al. |
| 2014/0161446 A1 | 6/2014 | Lee et al. |
| 2015/0023664 A1* | 1/2015 | Mukai ................. H04J 14/0257 398/58 |
| 2015/0050024 A1 | 2/2015 | Luo et al. |
| 2017/0207876 A1* | 7/2017 | Gao ................... H04J 14/0258 |

FOREIGN PATENT DOCUMENTS

| | | |
|---|---|---|
| CN | 102316015 A | 1/2012 |
| CN | 103139105 A | 6/2013 |
| CN | 103281623 A | 9/2013 |
| CN | 103973389 A | 8/2014 |
| CN | 104811238 A | 7/2015 |
| CN | 106470366 A | 3/2017 |
| CN | 107395315 A | 11/2017 |
| CN | 110224755 A | 9/2019 |
| EP | 3349479 A1 | 7/2018 |
| EP | 3537628 A1 | 9/2019 |
| IN | 102131130 A | 7/2011 |

\* cited by examiner

COMMUNICATION METHOD BASED ON PASSIVE OPTICAL NETWORK, RELATED DEVICE, AND SYSTEM

CROSS-REFERENCE TO RELATED APPLICATIONS

This application is a continuation of International Application No. PCT/CN2020/111023, filed on Aug. 25, 2020, which claims priority to Chinese Patent Application No. 201911032482.8, filed on Oct. 28, 2019. The disclosures of the aforementioned applications are hereby incorporated by reference in their entireties.

TECHNICAL FIELD

This application relates to the field of optical communications technologies, and specifically, to a communication method based on a passive optical network, a related device, and a system.

BACKGROUND

A passive optical network (PON) technology is a point-to-multipoint optical fiber access technology. Because an access network is sensitive to costs, a low-cost access technology is a main development direction. A method for increasing a rate of a PON system by using a single wavelength increases costs of an optical component. Therefore, in the conventional technology, a solution in which there are a plurality of upstream wavelength paths between an optical line terminal (OLT) and an optical network unit (ONU) is proposed.

A binding relationship between a downstream wavelength path and an upstream wavelength path is pre-stored on both an OLT side and an ONU side. When the OLT sends downstream service data to the ONU by using a downstream wavelength path, the ONU determines a corresponding upstream wavelength path based on the downstream wavelength path. The ONU may send upstream service data based on the upstream wavelength path.

It may be learned that in the solution provided in the conventional technology, the upstream wavelength path and the downstream wavelength path need to be bound in advance, and the OLT cannot flexibly indicate, to the ONU, the upstream wavelength path used to send the upstream service data.

SUMMARY

This application provides a communication method based on a passive optical network, a related device, and a system. In a scenario in which the PON supports a plurality of wavelength paths, an upstream wavelength path used to send upstream service data is flexibly indicated to an ONU to improve bandwidth utilization of the PON.

A first aspect of the embodiments of this application provides a communication method based on a passive optical network, where the passive optical network includes an optical line terminal (OLT) and a plurality of optical network units (ONUs), the OLT and the ONU communicate with each other by using at least one downstream wavelength path and a plurality of upstream wavelength paths, the plurality of ONUs include an activated ONU, and the method includes the OLT sends a first downstream frame to the activated ONU by using the at least one downstream wavelength path, where the first downstream frame includes a first path identifier used to identify a first upstream wavelength path, and the first upstream wavelength path is one of the plurality of upstream wavelength paths. The OLT receives upstream service data from the activated ONU by using the first upstream wavelength path.

In the method in this aspect, when the activated ONU supports a plurality of upstream wavelength paths, the OLT may send the first downstream frame to the activated ONU by using any one or more downstream wavelength paths, and the first upstream wavelength path indicated by the first downstream frame is any one of the plurality of upstream wavelength paths supported by the activated ONU. No binding relationship between an upstream wavelength path and a downstream wavelength path needs to be pre-stored on both an OLT side and an ONU side. Therefore, flexibility of indicating the first upstream wavelength path to the activated ONU is increased. In addition, the activated ONU supports a plurality of upstream wavelength paths. Therefore, bandwidth utilization of the passive optical network is improved, and efficiency of sending the upstream service data to the OLT by the activated ONU is improved.

Based on the first aspect of the embodiments of this application, in an optional implementation of the first aspect of the embodiments of this application, the plurality of ONUs further include a to-be-activated ONU, and the method further includes the OLT sends a second downstream frame to the to-be-activated ONU by using the at least one downstream wavelength path, where the second downstream frame includes a second path identifier used to identify a second upstream wavelength path, and the first upstream wavelength path and the second upstream wavelength path in the plurality of upstream wavelength paths do not interfere with each other. The OLT receives a registration request message from the to-be-activated ONU by using the second upstream wavelength path. The OLT completes ranging and registration on the to-be-activated ONU based on the registration request message.

In the method in this aspect, a process in which the to-be-activated ONU sends the registration request message to the OLT is not stopped in a process in which the activated ONU sends the upstream service data to the OLT. In addition, the process in which the activated ONU sends the upstream service data to the OLT is not stopped either in the process in which the to-be-activated ONU sends the registration request message to the OLT. It may be learned that the upstream service data and the registration request message may be separately transmitted to the OLT by using two upstream wavelength paths that do not interfere with each other. Therefore, efficiency of sending the upstream service data to the OLT is effectively improved, and a latency of transmitting the upstream service data to the OLT is reduced.

Based on the first aspect of the embodiments of this application, in an optional implementation of the first aspect of the embodiments of this application, that the first upstream wavelength path and the second upstream wavelength path in the plurality of upstream wavelength paths do not interfere with each other is specifically that if the first upstream wavelength path and the second upstream wavelength path are located in a same fiber, a wavelength corresponding to the first upstream wavelength path and a wavelength corresponding to the second upstream wavelength path are different from each other, or the first upstream wavelength path and the second upstream wavelength path are located in different fibers.

In the method in this aspect, the upstream service data and the registration request message may be separately transmitted to the OLT by using two upstream wavelength paths that do not interfere with each other. Therefore, efficiency of sending the upstream service data to the OLT is effectively improved, and a latency of transmitting the upstream service data to the OLT is reduced.

Based on the first aspect of the embodiments of this application, in an optional implementation of the first aspect of the embodiments of this application, the second upstream wavelength path corresponds to at least one registration period and at least one service period, and that the OLT sends a second downstream frame to the to-be-activated ONU by using the at least one downstream wavelength path includes the OLT sends the second downstream frame to the to-be-activated ONU within duration of the registration period by using the at least one downstream wavelength path. The method further includes the OLT sends a third downstream frame to the activated ONU in the service period by using the at least one downstream wavelength path, where the third downstream frame includes the second path identifier, and the second upstream wavelength path is used to transmit upstream service data from the activated ONU.

In the method in this aspect, when the second upstream wavelength path corresponds to at least one registration period and at least one service period, the OLT may perform registration and ranging on the to-be-activated ONU within the duration of the registration period. When the duration of the registration period expires, the OLT indicates, within duration of the service period, the activated ONU to send the upstream service data to the OLT. Therefore, a case in which the second upstream wavelength path is only used to transmit the second downstream frame when there is no to-be-activated ONU in the PON is avoided, a waste of bandwidth resources on the second upstream wavelength path is effectively avoided, bandwidth resource utilization of the PON is improved, and a data amount of upstream service data sent by the ONU to the OLT is improved.

Based on the first aspect of the embodiments of this application, in an optional implementation of the first aspect of the embodiments of this application, an allocation structure of a downstream frame includes an allocation identifier field and a path identifier field, and the downstream frame is one of the first downstream frame, the second downstream frame, or the third downstream frame.

With a structure of the downstream frame in this aspect, a corresponding upstream path may be indicated by using the path identifier field. For example, if the downstream frame is the first downstream frame, the path identifier field is used to carry the first path identifier. For another example, if the downstream frame is the second downstream frame, the path identifier field is used to carry the second path identifier. For another example, if the downstream frame is the third downstream frame, the path identifier field is used to carry the second path identifier. It may be learned that an upstream wavelength path can be indicated to the ONU by using the path identifier field added to the allocation structure of the downstream frame. This improves accuracy and efficiency of indicating the upstream wavelength path to the ONU by the OLT.

Based on the first aspect of the embodiments of this application, in an optional implementation of the first aspect of the embodiments of this application, if the downstream frame is the first downstream frame, the allocation identifier field is used to carry first instruction information, the first instruction information is used to instruct the activated ONU to send the upstream service data to the OLT, and the path identifier field is used to carry the first path identifier.

Based on the first aspect of the embodiments of this application, in an optional implementation of the first aspect of the embodiments of this application, if the downstream frame is the second downstream frame, the allocation identifier field is used to carry second instruction information, the second instruction information is used to instruct the to-be-activated ONU to be registered at the OLT, and the path identifier field is used to carry the second path identifier.

Based on the first aspect of the embodiments of this application, in an optional implementation of the first aspect of the embodiments of this application, if the downstream frame is the third downstream frame, the allocation identifier field is used to carry first instruction information, the first instruction information is used to instruct the activated ONU to send the upstream service data to the OLT, and the path identifier field is used to carry the second path identifier.

Based on the first aspect of the embodiments of this application, in an optional implementation of the first aspect of the embodiments of this application, a bit length of the allocation structure of the downstream frame is 64 bits.

The bit length of the allocation structure of the downstream frame provided in this aspect is 64 bits. It may be learned that the bit length of the allocation structure of the downstream frame is not increased relative to a bit length of an allocation structure of a gigabit-capable passive optical network (GPON) transmission convergence (GTC) downstream frame in an existing solution. To implement the communication method in any one of the foregoing implementations, the path identifier field can be further added without changing the bit length of the allocation structure of the downstream frame.

Based on the first aspect of the embodiments of this application, in an optional implementation of the first aspect of the embodiments of this application, bit lengths of a start time field and a grant size field each are 14 bits, and a bit length of the path identifier field is 4 bits.

When the bit length of the allocation structure of the downstream frame in this aspect is not increased relative to the bit length of the allocation structure of the GTC downstream frame in the existing solution, a bit length of another field included in the GTC downstream frame in the existing solution may be reduced, and a bit length obtained after reduction is allocated to the path identifier field.

Based on the first aspect of the embodiments of this application, in an optional implementation of the first aspect of the embodiments of this application, the bit length of the allocation structure of the downstream frame is greater than 64 bits, and the bit lengths of the start time field and the grant size field each are 16 bits.

When the bit length of the allocation structure of the downstream frame in this aspect is increased relative to the bit length of the allocation structure of the GTC downstream frame in the existing solution, the path identifier field may be added without changing a bit length of a field included in the GTC downstream frame in the existing solution.

A second aspect of the embodiments of this application provides a communication method based on a passive optical network, where the passive optical network includes an optical line terminal (OLT) and a plurality of optical network units (ONUs), the OLT and the ONU communicate with each other by using at least one downstream wavelength path and a plurality of upstream wavelength paths, and if the ONU is an activated ONU, the method includes the ONU receives a first downstream frame from the OLT by using the at least one downstream wavelength path, where the first downstream frame includes a first path identifier used to identify a first upstream wavelength path, and the first upstream wavelength path is one of the plurality of upstream wavelength paths. The ONU determines the first upstream wavelength path based on the first path identifier. The ONU sends upstream service data to the OLT by using the first upstream wavelength path.

For descriptions of a specific execution process and beneficial effects of the communication method in this aspect, refer to the first aspect. Details are not described again.

Based on the second aspect of the embodiments of this application, in an optional implementation of the second aspect of the embodiments of this application, if the ONU is a to-be-activated ONU, the method further includes the ONU receives a second downstream frame from the OLT by using the at least one downstream wavelength path, where the second downstream frame includes a second path identifier used to identify a second upstream wavelength path, and the first upstream wavelength path and the second upstream wavelength path in the plurality of upstream wavelength paths do not interfere with each other. The ONU sends a registration request message to the OLT by using the second upstream wavelength path.

Based on the second aspect of the embodiments of this application, in an optional implementation of the second aspect of the embodiments of this application, that the first upstream wavelength path and the second upstream wavelength path in the plurality of upstream wavelength paths do not interfere with each other is specifically that if the first upstream wavelength path and the second upstream wavelength path are located in a same fiber, a wavelength corresponding to the first upstream wavelength path and a wavelength corresponding to the second upstream wavelength path are different from each other, or the first upstream wavelength path and the second upstream wavelength path are located in different fibers.

Based on the second aspect of the embodiments of this application, in an optional implementation of the second aspect of the embodiments of this application, if the ONU is an activated ONU, the method further includes the ONU receives a third downstream frame from the OLT by using the at least one downstream wavelength path, where the third downstream frame includes the second path identifier, and the second upstream wavelength path is used to transmit upstream service data from the activated ONU.

Based on the second aspect of the embodiments of this application, in an optional implementation of the second aspect of the embodiments of this application, an allocation structure of a downstream frame includes an allocation identifier field and a path identifier field.

Based on the second aspect of the embodiments of this application, in an optional implementation of the second aspect of the embodiments of this application, if the downstream frame is the first downstream frame, the allocation identifier field is used to carry first instruction information, the first instruction information is used to instruct the activated ONU to send the upstream service data to the OLT, and the path identifier field is used to carry the first path identifier.

Based on the second aspect of the embodiments of this application, in an optional implementation of the second aspect of the embodiments of this application, if the downstream frame is the second downstream frame, the allocation identifier field is used to carry second instruction information, the second instruction information is used to instruct the to-be-activated ONU to be registered at the OLT, and the path identifier field is used to carry the second path identifier.

Based on the second aspect of the embodiments of this application, in an optional implementation of the second aspect of the embodiments of this application, if the downstream frame is the third downstream frame, the allocation identifier field is used to carry first instruction information, the first instruction information is used to instruct the activated ONU to send the upstream service data to the OLT, and the path identifier field is used to carry the second path identifier.

Based on the second aspect of the embodiments of this application, in an optional implementation of the second aspect of the embodiments of this application, a bit length of the allocation structure of the downstream frame is 64 bits.

Based on the second aspect of the embodiments of this application, in an optional implementation of the second aspect of the embodiments of this application, bit lengths of a start time field and a grant size field each are 14 bits, and a bit length of the path identifier field is 4 bits.

Based on the second aspect of the embodiments of this application, in an optional implementation of the second aspect of the embodiments of this application, the bit length of the allocation structure of the downstream frame is greater than 64 bits, and the bit lengths of the start time field and the grant size field each are 16 bits.

A third aspect of the embodiments of this application provides an optical line terminal (OLT), where the OLT is located in a passive optical network, the passive optical network further includes a plurality of optical network units (ONUs), the OLT and the ONU communicate with each other by using at least one downstream wavelength path and a plurality of upstream wavelength paths, the plurality of ONUs include an activated ONU, and the OLT includes a sending unit, configured to send a first downstream frame to the activated ONU by using the at least one downstream wavelength path, where the first downstream frame includes a first path identifier used to identify a first upstream wavelength path, and the first upstream wavelength path is one of the plurality of upstream wavelength paths, and a receiving unit, configured to receive upstream service data from the activated ONU by using the first upstream wavelength path.

The OLT in this aspect is configured to perform the communication method in the first aspect. For descriptions of a specific execution process and beneficial effects, refer to the first aspect. Details are not described again.

Based on the third aspect of the embodiments of this application, in an optional implementation of the third aspect of the embodiments of this application, the plurality of ONUs further include a to-be-activated ONU, the sending unit is further configured to send a second downstream frame to the to-be-activated ONU by using the at least one downstream wavelength path, where the second downstream frame includes a second path identifier used to identify a second upstream wavelength path, and the first upstream wavelength path and the second upstream wavelength path in the plurality of upstream wavelength paths do not interfere with each other, the receiving unit is further configured to receive a registration request message from the to-be-activated ONU by using the second upstream wavelength path, and the OLT further includes a processing unit, where the processing unit is configured to complete ranging and registration on the to-be-activated ONU based on the registration request message.

Based on the third aspect of the embodiments of this application, in an optional implementation of the third aspect of the embodiments of this application, the second upstream wavelength path corresponds to at least one registration period and at least one service period, and the sending unit is further configured to send the second downstream frame to the to-be-activated ONU within duration of the registration period by using the at least one downstream wavelength path, and send a third downstream frame to the activated ONU in the service period by using the at least one downstream wavelength path, where the third downstream frame includes the second path identifier, and the second upstream wavelength path is used to transmit upstream service data from the activated ONU.

A fourth aspect of the embodiments of this application provides an optical network unit (ONU), where the ONU is disposed in a passive optical network, the passive optical network further includes an optical line terminal (OLT), the OLT and the ONU communicate with each other by using at least one downstream wavelength path and a plurality of upstream wavelength paths, and if the ONU is an activated ONU, the ONU includes a receiving unit, configured to receive a first downstream frame from the OLT by using the at least one downstream wavelength path, where the first downstream frame includes a first path identifier used to identify a first upstream wavelength path, and the first upstream wavelength path is one of the plurality of upstream wavelength paths, a processing unit, configured to determine the first upstream wavelength path based on the first path identifier, and a sending unit, configured to send upstream service data to the OLT by using the first upstream wavelength path.

Based on the fourth aspect of the embodiments of this application, in an optional implementation of the fourth aspect of the embodiments of this application, if the ONU is a to-be-activated ONU, the receiving unit is further configured to receive a second downstream frame from the OLT by using the at least one downstream wavelength path, where the second downstream frame includes a second path identifier used to identify a second upstream wavelength path, and the first upstream wavelength path and the second upstream wavelength path in the plurality of upstream wavelength paths do not interfere with each other, and the sending unit is further configured to send a registration request message to the OLT by using the second upstream wavelength path.

Based on the fourth aspect of the embodiments of this application, in an optional implementation of the fourth aspect of the embodiments of this application, if the ONU is an activated ONU, the receiving unit is further configured to receive a third downstream frame from the OLT by using the at least one downstream wavelength path, where the third downstream frame includes the second path identifier, and the second upstream wavelength path is used to transmit upstream service data from the activated ONU.

A fifth aspect of the embodiments of this application provides an optical line terminal (OLT), where the OLT is located in a passive optical network, the passive optical network further includes a plurality of optical network units (ONUs), the OLT and the ONU communicate with each other by using at least one downstream wavelength path and a plurality of upstream wavelength paths, the plurality of ONUs include an activated ONU, and the OLT includes a processor, a memory, an optical transmitter, and an optical receiver, where the processor and the memory are interconnected by using a line, and the processor and both the optical transmitter and the optical receiver are further interconnected, the optical transmitter is configured to send a first downstream frame to the activated ONU by using the at least one downstream wavelength path, where the first downstream frame includes a first path identifier used to identify a first upstream wavelength path, and the first upstream wavelength path is one of the plurality of upstream wavelength paths, and the optical receiver is configured to receive upstream service data from the activated ONU by using the first upstream wavelength path.

Based on the fifth aspect of the embodiments of this application, in an optional implementation of the fifth aspect of the embodiments of this application, the plurality of ONUs further include a to-be-activated ONU, the optical transmitter is further configured to send a second downstream frame to the to-be-activated ONU by using the at least one downstream wavelength path, where the second downstream frame includes a second path identifier used to identify a second upstream wavelength path, and the first upstream wavelength path and the second upstream wavelength path in the plurality of upstream wavelength paths do not interfere with each other, the optical receiver is further configured to receive a registration request message from the to-be-activated ONU by using the second upstream wavelength path, and the processor is further configured to invoke program code stored in the memory to perform completing ranging and registration on the to-be-activated ONU based on the registration request message.

Based on the fifth aspect of the embodiments of this application, in an optional implementation of the fifth aspect of the embodiments of this application, the second upstream wavelength path corresponds to at least one registration period and at least one service period, and the optical transmitter is further configured to send the second downstream frame to the to-be-activated ONU within duration of the registration period by using the at least one downstream wavelength path, and send a third downstream frame to the activated ONU in the service period by using the at least one downstream wavelength path, where the third downstream frame includes the second path identifier, and the second upstream wavelength path is used to transmit upstream service data from the activated ONU.

A sixth aspect of the embodiments of this application provides an optical network unit (ONU), where the ONU is disposed in a passive optical network, the passive optical network further includes an optical line terminal (OLT), the OLT and the ONU communicate with each other by using at least one downstream wavelength path and a plurality of upstream wavelength paths, and if the ONU is an activated ONU, the ONU includes a processor, a memory, an optical transmitter, and an optical receiver, where the processor and the memory are interconnected by using a line, and the processor and both the optical transmitter and the optical receiver are further interconnected, the optical receiver is configured to receive a first downstream frame from the OLT by using the at least one downstream wavelength path, where the first downstream frame includes a first path identifier used to identify a first upstream wavelength path, and the first upstream wavelength path is one of the plurality of upstream wavelength paths, the processor is further configured to invoke program code stored in the memory to perform determining the first upstream wavelength path based on the first path identifier, and the optical transmitter is configured to send upstream service data to the OLT by using the first upstream wavelength path.

Based on the sixth aspect of the embodiments of this application, in an optional implementation of the sixth aspect of the embodiments of this application, if the ONU is a to-be-activated ONU, the optical receiver is further configured to receive a second downstream frame from the OLT by using the at least one downstream wavelength path, where the second downstream frame includes a second path identifier used to identify a second upstream wavelength path, and the first upstream wavelength path and the second upstream wavelength path in the plurality of upstream wavelength paths do not interfere with each other, and the optical transmitter is further configured to send a registration request message to the OLT by using the second upstream wavelength path.

Based on the sixth aspect of the embodiments of this application, in an optional implementation of the sixth aspect of the embodiments of this application, if the ONU is an activated ONU, the optical receiver is further configured to receive a third downstream frame from the OLT by using the at least one downstream wavelength path, where the third downstream frame includes the second path identifier, and the second upstream wavelength path is used to transmit upstream service data from the activated ONU.

A seventh aspect of the embodiments of this application provides a passive optical network system, including an optical line terminal (OLT) configured to perform the method in any one of the implementations of the first aspect and an optical network unit (ONU) configured to perform the method in any one of the implementations of the second aspect.

An eighth aspect of the embodiments of this application provides a digital processing chip, where the chip includes a processor and a memory, the memory and the processor are interconnected by using a line, the memory stores instructions, and the processor is configured to perform the communication method in any one of the implementations of the first aspect or the second aspect.

A ninth aspect of the embodiments of this application provides a computer-readable storage medium, including instructions. When the instructions are run on a computer, the computer is enabled to perform the communication method in any one of the implementations of the first aspect or the second aspect.

A tenth aspect of the embodiments of this application provides a computer program product including instructions. When the computer program product is run on a computer, the computer is enabled to perform the communication method in any one of the implementations of the first aspect or the second aspect.

DETAILED DESCRIPTION OF ILLUSTRATIVE EMBODIMENTS

Embodiments of this application provide a communication method based on a passive optical network. In a scenario in which the PON supports a plurality of wavelength paths, an upstream wavelength path used to transmit upstream service data is flexibly indicated to an ONU to improve bandwidth utilization of the PON.

To make the invention objectives, features, and advantages of this application clearer and more comprehensible, the following clearly describes the technical solutions in the embodiments of this application with reference to the accompanying drawings in the embodiments of this application. Apparently, the embodiments described in the following are merely some rather than all of the embodiments of this application. All other embodiments obtained by a person of ordinary skill in the art based on the embodiments of this application without creative efforts shall fall within the protection scope of this application.

Figure 1:
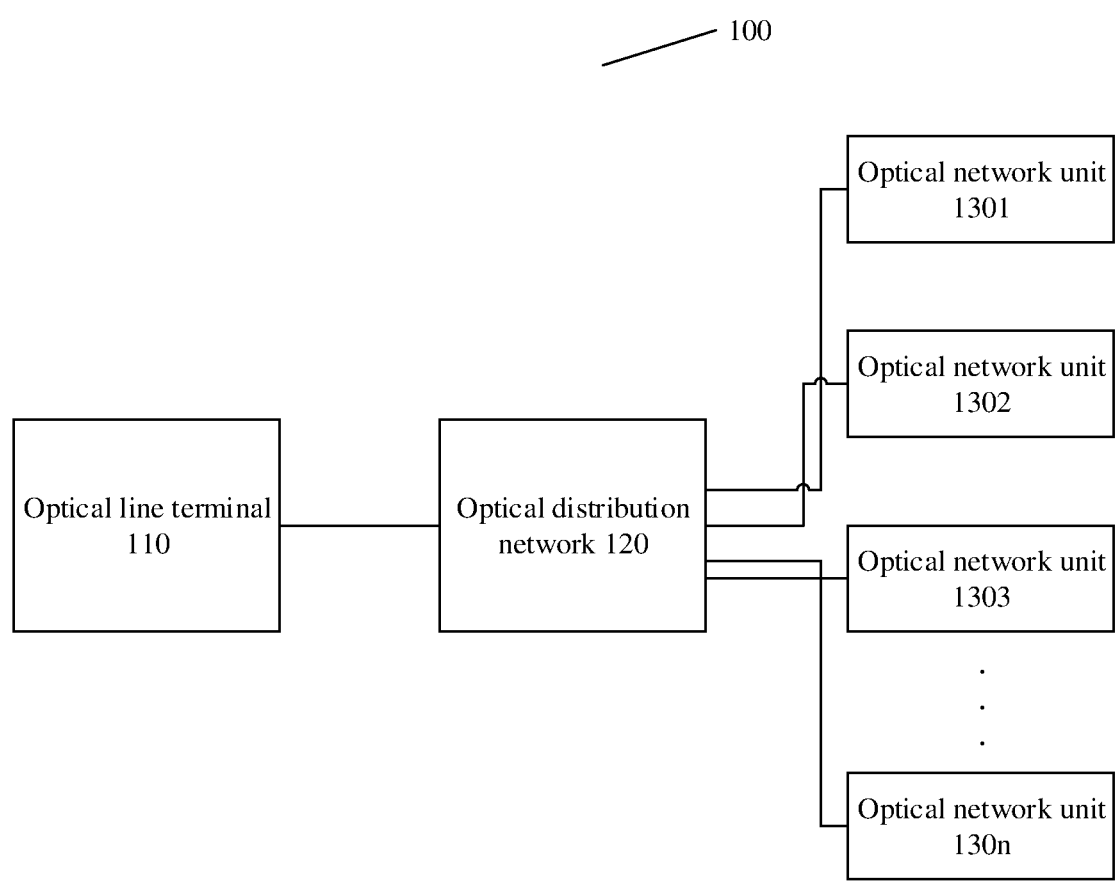
FIG. 1 is an example diagram of a network architecture of a passive optical network to which a communication method according to this application is applied.

With reference to FIG. 1, the following first uses an example to describe a network architecture of a passive optical network to which a communication method in this application is applied.

As shown in FIG. 1, a passive optical network 100 in this embodiment includes one or more optical line terminals (OLTs) no, an optical distribution network (ODN) 120, and a plurality of optical network units (ONUs).

The OLT 110 is connected to the plurality of ONUs in a point-to-multipoint manner by using the ODN 120. In this embodiment, an example in which the passive optical network 100 includes one OLT 110 is used for description. A specific quantity of ONUs is not limited in this embodiment, provided that there are a plurality of ONUs. For example, the passive optical network in this embodiment includes n ONUs: an ONU 1301, an ONU 1302, . . . , and an ONU 130*n*.

To better describe a process of communicating upstream and downstream service data in this application, in this application, a direction from the OLT 110 to the ONU is defined as a downstream direction, and a direction from the ONU to the OLT 110 is defined as an upstream direction.

The passive optical network may be a communications network that implements communication between the OLT 110 and each of the ONU 1301, the ONU 1302, . . . , and the ONU 130*n* without any active component. Specifically, communication between the OLT no and each of the ONU 1301, the ONU 1302, . . . , and the ONU 130*n* may be implemented by using a passive optical component in the ODN 120. The passive optical component includes but is not limited to an optical splitter or a multiplexer.

The OLT 110 is usually located in a central office (CO), and the OLT 110 may manage the ONU 1301, the ONU 1302, . . . , and the ONU 130*n* together. The OLT 110 may serve as a medium between an upper-layer network and each of the ONU 1301, the ONU 1302, . . . , and the ONU 130n. For example, in the downstream direction, the OLT 110 uses data received from the upper-layer network as downstream service data, and forwards the downstream service data to the ONU 1301, the ONU 1302, . . . , and the ONU 130n by using a downstream wavelength path. For another example, in the upstream direction, the OLT 110 forwards, to the upper-layer network by using an upstream wavelength path, upstream service data received from the ONU 1301, the ONU 1302, . . . , and the ONU 130n.

The ODN 120 may be a data distribution system, and may include a fiber, an optical coupler, an optical splitter, an optical multiplexer, and/or another device. In an embodiment, the fiber, the optical coupler, the optical splitter, the optical multiplexer, and/or the another device each may be a passive optical component. Specifically, the fiber, the optical coupler, the optical splitter, the optical multiplexer, and/or the another device each may be a component that distributes a data signal between the OLT 110 and each of the ONU 1301, the ONU 1302, . . . , and the ONU 130n without support of a power supply. In addition, in another embodiment, the ODN 120 may further include one or more processing devices, for example, an optical amplifier or a relay device. The ODN 120 may specifically extend from the OLT 110 to the ONU 1301, the ONU 1302, . . . , and the ONU 130n, but may be alternatively configured to have any other point-to-multipoint structure. This is not specifically limited in this embodiment.

The ONU 1301, the ONU 1302, . . . , and the ONU 130n may be disposed at user-side locations (for example, customer premises) in a distributed manner. The ONU 1301, the ONU 1302, . . . , and the ONU 130n may be network devices configured to communicate with the OLT no and a user. Specifically, the ONU 1301, the ONU 1302, . . . , and the ONU 130n may serve as media between the OLT 110 and the user. For example, the ONU 1301, the ONU 1302, . . . , and the ONU 130n may forward, to the user, downstream service data received from the OLT 110, and use data received from the user as upstream service data to forward the upstream service data to the OLT 110. It should be understood that structures of the ONU 1301, the ONU 1302, . . . , and the ONU 130n are similar to that of an optical network terminal (ONT). Therefore, in the solutions provided in this application document, the optical network unit and the optical network terminal are interchangeable.

Specifically, any ONU in the ONU 1301, the ONU 1302, . . . , and the ONU 130n in this embodiment corresponds to a path set, and the path set includes at least one downstream wavelength path and a plurality of upstream wavelength paths. Specific quantities of downstream wavelength paths and upstream wavelength paths that are included in the path set are not limited in this embodiment. For better understanding, the following uses FIG. 2 as an example for description. A path set corresponding to the ONU 1301 includes one downstream wavelength path $\lambda d1$ and two upstream wavelength paths. The two upstream wavelength paths may be $\lambda u1$ and $\lambda u2$ shown in FIG. 2.

Figure 2:
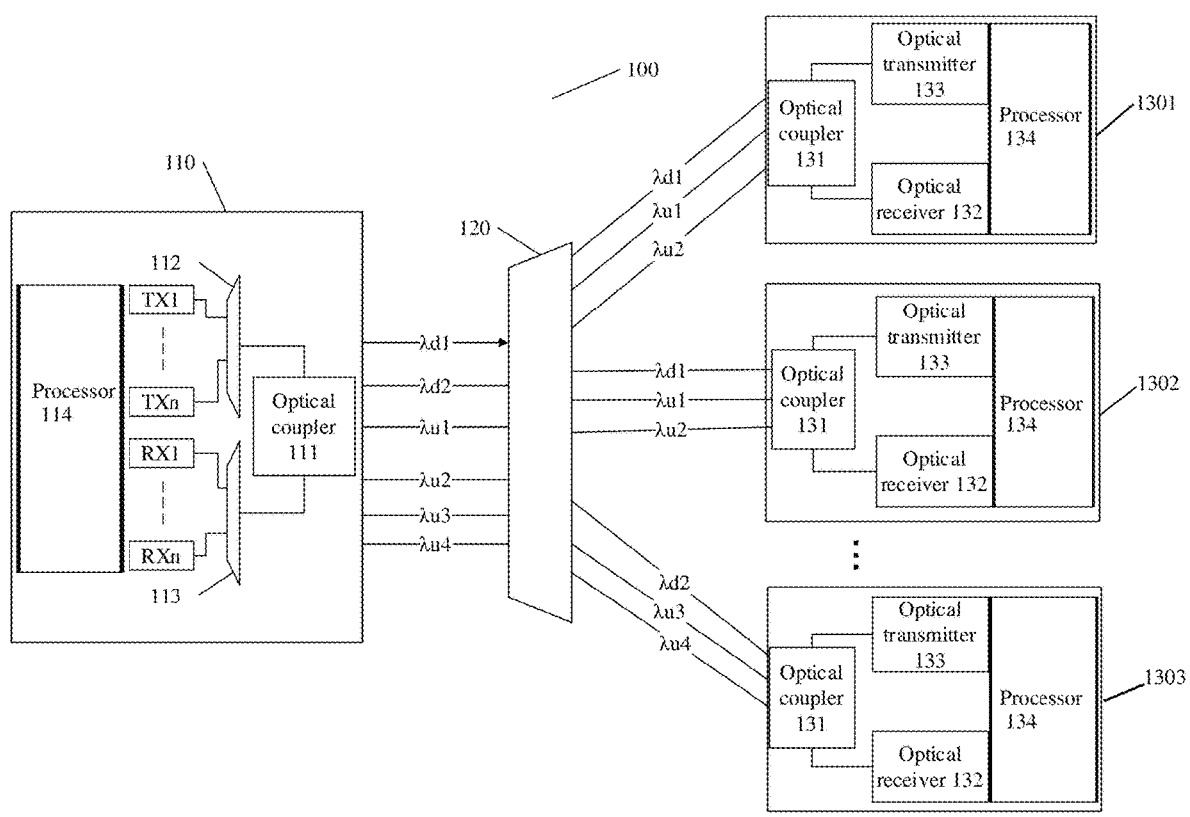
FIG. 2 is another example diagram of a network architecture of a passive optical network to which a communication method according to this application is applied.

Optionally, that different ONUs may correspond to a same path set in this embodiment specifically means that the different ONUs correspond to a same downstream wavelength path and same upstream wavelength paths. FIG. 2 is still used as an example. If the ONU 1301 and the ONU 1302 correspond to same wavelength paths, both the ONU 1301 and the ONU 1302 correspond to the downstream wavelength path $\lambda d1$, the upstream wavelength path $\lambda u1$, and the upstream wavelength path $\lambda u2$.

Optionally, different ONUs may alternatively correspond to different path sets in this embodiment. FIG. 2 is still used as an example. The ONU 1301 and the ONU ion correspond to different wavelength paths, for example, the ONU 1301 corresponds to the downstream wavelength path $\lambda d1$, the upstream wavelength path $\lambda u1$, and the upstream wavelength path $\lambda u2$, and the ONU 130n corresponds to a downstream wavelength path $\lambda d2$, an upstream wavelength path $\lambda u3$, and an upstream wavelength path $\lambda u4$.

The following specifically describes the upstream wavelength path and the downstream wavelength path.

The path set shown in FIG. 2 is used as an example for description. It should be noted that a quantity of upstream wavelength paths and a quantity of downstream wavelength paths in another path set included in the passive optical network are not limited in this embodiment.

When the path set corresponding to the ONU 1301 includes the downstream wavelength path $\lambda d1$, the upstream wavelength path $\lambda u1$, and the upstream wavelength path $\lambda u2$, a downstream wavelength corresponding to the downstream wavelength path $\lambda d1$ is $\lambda nd1$, an upstream wavelength corresponding to the upstream wavelength path $\lambda u1$ is $\lambda nu1$, and an upstream wavelength corresponding to the upstream wavelength path $\lambda u2$ is $\lambda nu2$.

When the passive optical network supports a plurality of path sets in this embodiment, that is, when the passive optical network supports at least one downstream wavelength and a plurality of upstream wavelengths, an optical transmission medium of the ODN 120 is shared between a plurality of upstream wavelength paths through wavelength division multiplexing (WDM), and the optical transmission medium of the ODN 120 is also shared between a plurality of downstream wavelength paths through WDM. In addition, for the passive optical network, one or more pieces of service data may be borne on each upstream wavelength path or each downstream wavelength path. An example in which a plurality of ONUs correspond to a same upstream wavelength path is used. In this case, the plurality of ONUs corresponding to the same upstream wavelength path may share the upstream wavelength path through time division multiplexing (TDM).

Optionally, each wavelength path (an upstream wavelength path or a downstream wavelength path) may have a corresponding path identifier. FIG. 2 is used as an example. Path identifiers of the downstream wavelength path $\lambda d1$, the upstream wavelength path $\lambda u1$, and the upstream wavelength path $\lambda u2$ may be respectively 1, 2, and 3. To be specific, there is a matching relationship between a path identifier and an operating wavelength corresponding to a wavelength path identified by the path identifier. The OLT 110 and the ONU 1301 may learn of the upstream wavelengths and the downstream wavelength corresponding to the wavelength paths based on the path identifiers.

FIG. 2 is still used as an example. The OLT 110 may include an optical coupler 111, a first wavelength division multiplexer 112, a second wavelength division multiplexer 113, a plurality of downstream optical transmitters Tx1 to Txn, a plurality of upstream optical receivers Rx1 to Rxn, and a processor 114. The plurality of downstream optical transmitters Tx1 to Txn are connected to the optical coupler 111 by using the first wavelength division multiplexer 112, the plurality of upstream optical receivers Rx1 to Rxn are connected to the optical coupler 111 by using the second wavelength division multiplexer 113, and the coupler 111 is further connected to the ODN 120.

Respective downstream transmit wavelengths corresponding to the plurality of downstream optical transmitters Tx1 to Txn are different. Each downstream optical transmitter in the downstream optical transmitters Tx1 to Txn may correspond to a downstream wavelength path. For example, the plurality of downstream optical transmitters Tx1 to Txn may respectively correspond to downstream wavelength paths λd1 to λdn, and downstream wavelengths respectively corresponding to the downstream wavelength paths λd1 to λdn are respectively λnd1 to λndn. The downstream optical transmitters Tx1 to Txn may respectively transmit downstream service data to the corresponding wavelength paths by using the transmit wavelengths λnd1 to Xndn corresponding to the downstream optical transmitters Tx1 to Txn, so that ONUs that operate on the corresponding wavelength paths receive the downstream service data.

Correspondingly, receive wavelengths corresponding to the plurality of upstream optical receivers Rx1 to Rxn may be different. The upstream optical receivers Rx1 to Rxn also respectively correspond to upstream wavelength path λu1 to λun, and upstream wavelengths respectively corresponding to the upstream wavelength path λu1 to λun are respectively λnu1 to λnun. Therefore, it may be learned that the upstream optical receivers Rx1 to Rxn may respectively receive, by using the receive wavelengths λnu1 to λnun corresponding to the upstream optical receivers Rx1 to Rxn, upstream service data sent by ONUs that operate on the corresponding wavelength paths.

The first wavelength division multiplexer 112 is configured to perform wavelength division multiplexing processing on the downstream service data that is transmitted by the plurality of downstream optical transmitters Tx1 to Txn and that respectively corresponds to the wavelengths λnd1 to λndn, and send the downstream service data to the ODN 120 by using the optical coupler 111, to provide the downstream service data to the ONUs by using the ODN 120. In addition, the optical coupler 111 may be further configured to provide, to the second wavelength division multiplexer 113, the upstream service data that is from the plurality of ONUs and that respectively corresponds to the upstream wavelengths λnu1 to λnun, and the second wavelength division multiplexer 113 may demultiplex the upstream service data respectively corresponding to the wavelengths λnu1 to λnun to the upstream optical receivers Rx1 to Rxn for data receiving.

The processor 114 may be a media access control (MAC) module. In an aspect, the processor 114 may specify operating wavelength paths for a plurality of ONUs through wavelength negotiation, and provide, based on an operating wavelength path corresponding to an ONU, downstream service data to be sent to the ONU to the downstream optical transmitters Tx1 to Txn corresponding to the wavelength path, so that the downstream optical transmitters Tx1 to Txn transmit the downstream service data on the corresponding wavelength path. In another aspect, the processor 114 may further perform dynamic bandwidth allocation (DBA) for upstream sending on each wavelength path, and allocate upstream sending timeslots to ONUs that perform multiplexing on a same wavelength path through TDM, to grant the ONUs sending of upstream service data in the specified timeslots by using the wavelength path corresponding to the ONUs.

The ONU may include an optical coupler 131, an optical receiver 132, an optical transmitter 133, and a processor 134. The optical receiver 132 and the optical transmitter 133 are connected to the ODN 120 by using the optical coupler 131. In an aspect, the optical coupler 131 may provide, to the ODN 120, upstream service data sent by the optical transmitter 133, to send the upstream service data to the OLT 110 by using the ODN 120. In another aspect, the optical coupler 131 may further provide, to the optical receiver 132 for data receiving, downstream service data sent by the OLT 110 by using the ODN 120.

The processor 134 may be a media access controller (MAC) module or a microprocessor. The processor 134 may perform wavelength negotiation with the OLT 110, and adjust a receive wavelength corresponding to the optical receiver 132 and a transmit wavelength corresponding to the optical transmitter 133 (that is, adjust a downstream receive wavelength and an upstream transmit wavelength corresponding to the ONU 120) based on an operating wavelength path specified by the OLT 110, so that the ONU 120 operates on the operating wavelength path specified by the OLT 110. In addition, the processor 134 may further control, based on a dynamic bandwidth allocation result of the OLT 110, the optical transmitter 133 to send upstream service data in a specified timeslot.

It should be understood that the passive optical network in this embodiment is applicable to a 10-gigabit-capable passive optical network (XG-PON), or is applicable to a 10-gigabit-capable symmetric passive optical network (XGS-PON), a gigabit-capable passive optical network (GPON), and the like.

Figure 3:
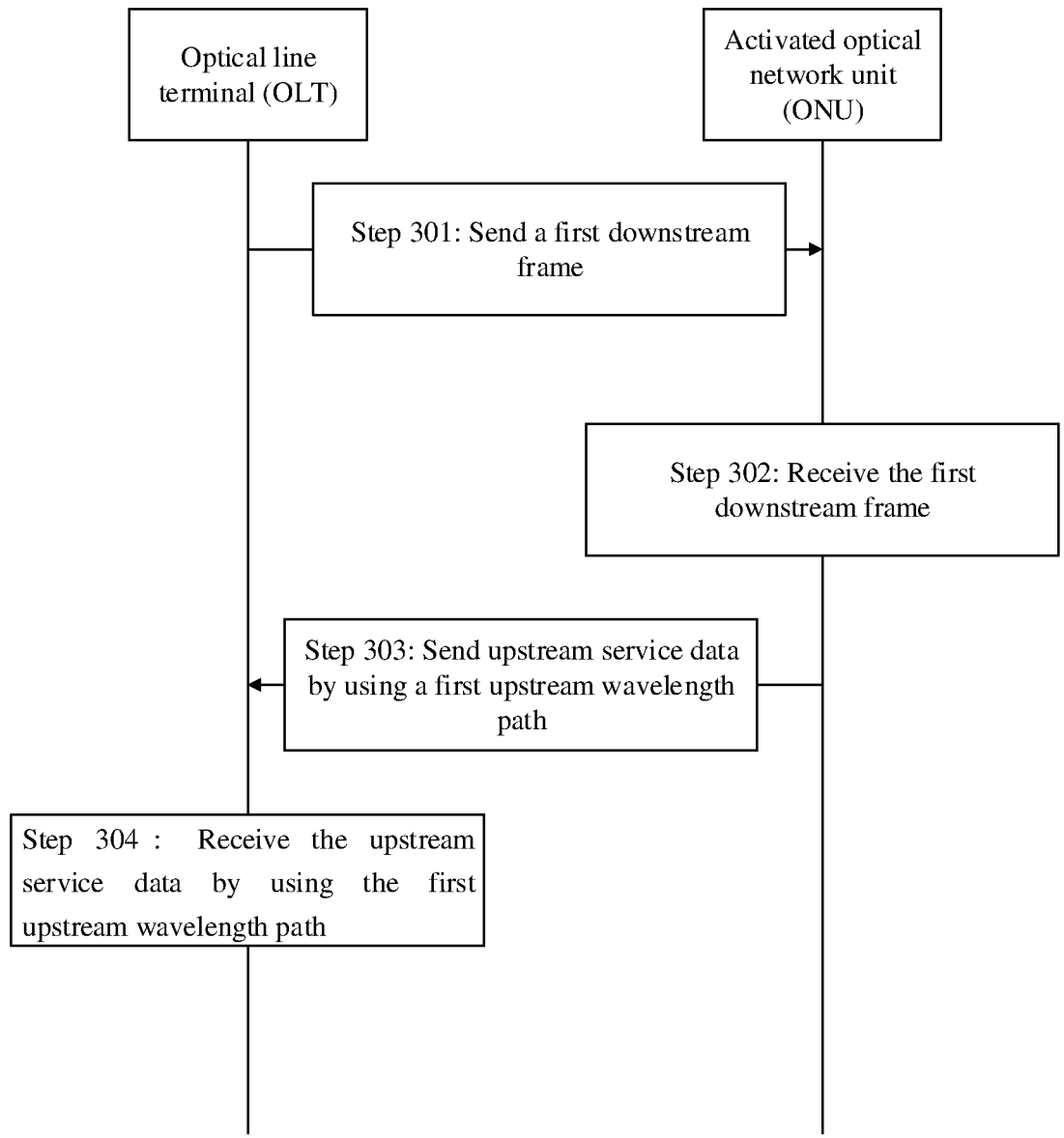
FIG. 3 is a flowchart of steps of a communication method according to another embodiment of this application.

Based on the foregoing passive optical network, with reference to FIG. 3, the following uses an example to describe a specific execution process of a communication method based on a passive optical network provided in an embodiment.

Step 301: An OLT sends a first downstream frame to an activated ONU.

In this embodiment, the activated ONU is an ONU that is in a plurality of ONUs included in the passive optical network and on which the OLT has completed ranging and registration. It may be learned from the foregoing descriptions of the passive optical network that, in this embodiment, at least one downstream wavelength path and a plurality of upstream wavelength paths exist between the OLT and the activated ONU. The OLT may select a first upstream wavelength path from the plurality of upstream wavelength paths. It may be learned that the first upstream wavelength path is one of the plurality of upstream wavelength paths between the OLT and the activated ONU. The first upstream wavelength path is an upstream wavelength path that is used by the OLT to receive upstream service data from the activated ONU.

After the OLT selects the first upstream wavelength path, the OLT may notify the activated ONU of the first upstream wavelength path, so that the activated ONU sends the upstream service data to the OLT based on the first upstream wavelength path.

The following describes how the OLT notifies the activated ONU of the first upstream wavelength path, so that the ONU can send the upstream service data by using the first upstream wavelength path.

The OLT may determine the first downstream frame. The first downstream frame includes a first path identifier, and the first path identifier is an identifier used to identify the first upstream wavelength path. A specific value of the first path identifier is not limited in this embodiment, provided that a mapping relationship between the first path identifier and the first upstream wavelength path is set on both the OLT and the activated ONU.

A specific type of the first downstream frame in this embodiment is not limited, provided that the type of the first downstream frame can match a network. For example, if the network is a PON, the first downstream frame is a GPON transmission convergence (GTC) frame. For another example, if the network is a 10-gigabit-capable passive optical network, the first downstream frame is 10-gigabit-capable passive optical network transmission convergence (XGTC) frame.

The following describes several optional manners of information included in the first downstream frame in this embodiment.

Manner 1

The first downstream frame includes the first path identifier and first instruction information. The first instruction information is used to instruct the activated ONU to send the upstream service data to the OLT.

Manner 2

The first downstream frame includes first instruction information and first timeslot indication information. The first timeslot indication information is used to indicate a service start-stop timeslot. The service start-stop timeslot is a start-stop timeslot used to transmit the upstream service data.

Manner 3

The first downstream frame includes first instruction information, first timeslot indication information, and the first path identifier.

Specifically, if the OLT can indicate, by using one first downstream frame, the ONU to send the upstream service data in a specified start-stop timeslot and on a specified upstream wavelength path, information included in the first downstream frame may be shown in the foregoing Manner 3.

If the OLT indicates, by using two first downstream frames, the ONU to send the upstream service data in a specified start-stop timeslot and on a specified upstream wavelength path, information included in the two first downstream frames are respectively shown in the foregoing Manner 1 and Manner 2. In addition, the two first downstream frames include same first instruction information.

It may be learned that, in this embodiment, the OLT may send the first instruction information, the first path identifier, and the first timeslot indication information to the activated ONU by using one first downstream frame. Alternatively, the OLT may send the first instruction information, the first path identifier, and the first timeslot indication information to the activated ONU by using a plurality of first downstream frames together.

It may be learned that, in a manner of sending the first downstream frame to the activated ONU by the OLT, the activated ONU that has the first instruction information can send the upstream service data within a time range of the service start-stop timeslot indicated by the first timeslot indication information and by using the first upstream wavelength path identified by the first path identifier.

The following uses an example to describe a manner in which the OLT sends the first downstream frame to the activated ONU.

Manner 1

When there is one first downstream frame, the OLT may send the first downstream frame to the activated ONU by using one downstream wavelength path.

Manner 2

When there are a plurality of first downstream frames, the OLT may send the first downstream frames to the activated ONU by using a plurality of downstream wavelength paths.

Manner 3

When there are a plurality of first downstream frames, the OLT may also send the first downstream frames to the activated ONU by using one downstream wavelength path.

A specific quantity of first downstream frames and a specific quantity of downstream wavelength paths used to send the first downstream frames are not limited in this embodiment. In this embodiment, an example in which there is one first downstream frame is used for description.

Because the activated ONU in the passive optical network supports a plurality of upstream wavelength paths, the OLT may select an upstream wavelength path from the plurality of upstream wavelength paths in advance. A specific manner of selecting the upstream wavelength path is not limited in this embodiment, and optional manners are as follows.

Manner 1

The OLT may select the first upstream wavelength path from the plurality of upstream wavelength paths based on a service type. Specifically, the OLT may create a relationship between different service types and different upstream wavelength paths in advance. When the OLT determines a service type to be executed by the activated ONU, the OLT may indicate, to the activated ONU, the first upstream wavelength path corresponding to the service type to be executed by the activated ONU.

Manner 2

The OLT may select the first upstream wavelength path based on load corresponding to each upstream wavelength path in the plurality of upstream wavelength paths. Still referring to FIG. 2, when the ONU 1301 supports the upstream wavelength path $\lambda u1$ and the upstream wavelength path $\lambda u2$, if the OLT determines that load corresponding to $\lambda u1$ is less than load corresponding to $\lambda u2$, the OLT may indicate the upstream wavelength path $\lambda u1$ to the activated ONU. Specifically, this is not limited in this embodiment.

Optionally, the first upstream wavelength path indicated by the first path identifier in this embodiment may be any upstream wavelength path shown in FIG. 1 to FIG. 2. The first upstream wavelength path is described in this embodiment by using an optional example, and no limitation is imposed. In another example, the first upstream wavelength path may be a virtual upstream wavelength path, that is, different virtual upstream wavelength paths supported by the activated ONU are used to transmit different types of upstream service data. The OLT may allocate different virtual upstream wavelength paths to different service types based on a service type. The OLT may implement upstream granting for different services by using path identifiers corresponding to the virtual upstream wavelength paths, so that the activated ONU can send the upstream service data on the virtual upstream wavelength paths granted by the OLT by using the path identifiers.

Step 302: The activated ONU receives the first downstream frame.

Specifically, the activated ONU in this embodiment receives the first downstream frame that includes the first instruction information. More specifically, the activated ONU pre-stores first instruction information. When the OLT broadcasts the first downstream frame to a plurality of activated ONUs in the passive optical network, the activated ONU may first determine whether the first instruction information included in the first downstream frame is the same as the first instruction information stored in the activated ONU. If the first instruction information included in the first downstream frame is the same as the first instruction information stored in the activated ONU, the activated ONU may determine, based on the first downstream frame, the first upstream wavelength path used to send the upstream service data.

Step 303: The activated ONU sends the upstream service data to the OLT by using the first upstream wavelength path.

In this embodiment, when the activated ONU receives the first downstream frame, the activated ONU may decapsulate the first downstream frame to obtain the first path identifier and the first timeslot indication information that are included in the first downstream frame.

The activated ONU may send an upstream service data based on the information included in the first downstream frame. Specifically, the activated ONU sends the upstream service data to the OLT within the time range of the service start-stop timeslot by using the first upstream wavelength path identified by the first path identifier.

Step 304: The OLT receives the upstream service data from the activated ONU by using the first upstream wavelength path.

It may be learned that in the method in this embodiment, the OLT can receive, based on the selected first upstream wavelength path, the upstream service data sent by the activated ONU.

Beneficial effects of using the method in this embodiment are as follows.

When the activated ONU supports a plurality of upstream wavelength paths, no binding relationship is required between an upstream wavelength path and a downstream wavelength path, the OLT may send the first downstream frame to the activated ONU by using any one or more downstream wavelength paths, and the first upstream wavelength path indicated by the first downstream frame is any one of the plurality of upstream wavelength paths supported by the activated ONU. Therefore, flexibility of indicating the first upstream wavelength path to the activated ONU is increased. In addition, the activated ONU supports a plurality of upstream wavelength paths. Therefore, bandwidth utilization of the passive optical network is improved, and efficiency of sending the upstream service data to the OLT by the activated ONU is improved.

Figure 4:
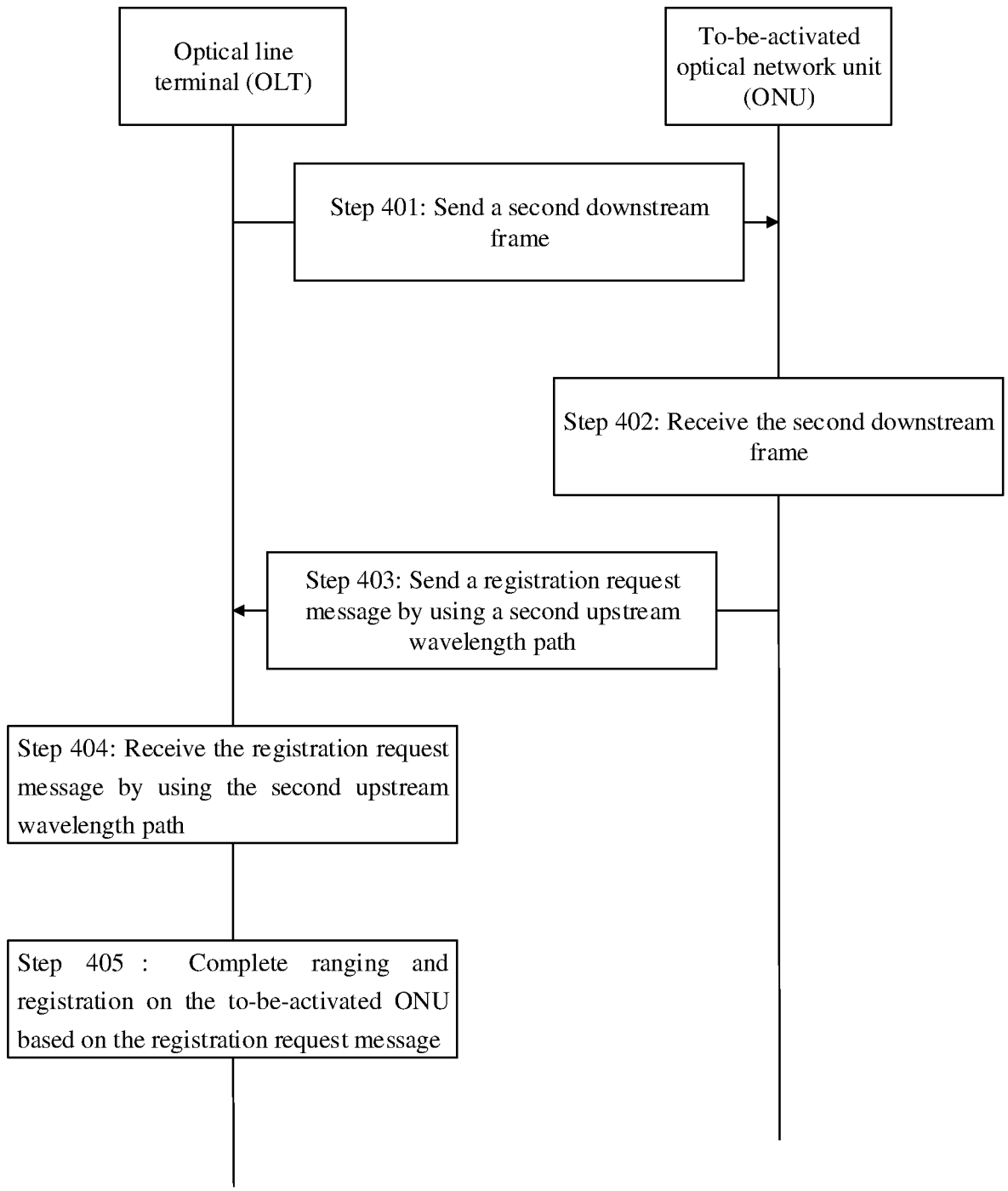
FIG. 4 is a flowchart of steps of a communication method according to another embodiment of this application.

With reference to FIG. 4, the following uses an example to describe another embodiment of the communication method in this application. On the basis of the embodiment shown in FIG. 3, a latency of communication between an OLT and ONUs may be further reduced by using the method in this embodiment. A specific execution process is as follows.

The following first describes importance of reducing the latency of communication between the OLT and the ONUs by using the method in this embodiment.

With application of a fifth-generation mobile communications technology (5G), bearing a low-latency service in 5G is an important application scenario of a next-generation PON system. The communication method in this embodiment can be used to meet a requirement of bearing the low-latency service in 5G. In the communication method in this embodiment, FIG. 2 is still used as an example, that is, an example in which the ONU 1301 supports the upstream wavelength path λu1 and the upstream wavelength path λu2 is used.

Step 401: The OLT sends a second downstream frame to a to-be-activated ONU.

The OLT may determine the second downstream frame. The second downstream frame includes a second path identifier, and the second path identifier is an identifier used to identify a second upstream wavelength path. A specific value of the second path identifier is not limited in this embodiment, provided that a mapping relationship between the second path identifier and the second upstream wavelength path is set on both the OLT and the to-be-activated ONU. For descriptions of a specific type of the second downstream frame, refer to the descriptions of the type of the first downstream frame shown in FIG. 3. Details are not described again.

The following describes several optional manners of information included in the second downstream frame in this embodiment.

Manner 1

The second downstream frame includes the second path identifier and second instruction information. The second instruction information is used to instruct the to-be-activated ONU to send a registration request message of the to-be-activated ONU to the OLT.

Manner 2

The second downstream frame includes second instruction information and second timeslot indication information. The second timeslot indication information is used to indicate a registration start-stop timeslot. The registration start-stop timeslot is a start-stop timeslot used to transmit the registration request message of the to-be-activated ONU.

Manner 3

The second downstream frame includes the second path identifier, second instruction information, and second timeslot indication information.

Specifically, if the OLT can indicate, by using one second downstream frame, the to-be-activated ONU to send the registration request message to the OLT in a specified start-stop timeslot and on a specified upstream wavelength path, information included in the second downstream frame may be shown in the foregoing Manner 3.

If the OLT indicates, by using two second downstream frames, the to-be-activated ONU to send the registration request message in a specified start-stop timeslot and on a specified upstream wavelength path, information included in the two second downstream frames are respectively shown in the foregoing Manner 1 and Manner 2. In addition, the two second downstream frames include same second instruction information.

The PON system includes a plurality of ONUs. An activated ONU does not respond to the second downstream frame that includes the second instruction information, and only the to-be-activated ONU responds to the second downstream frame that includes the second instruction information, and sends the registration request message to the OLT based on an indication in the second downstream frame.

It may be learned that, in this embodiment, the OLT may send the second instruction information, the second path identifier, and the second timeslot indication information to the to-be-activated ONU by using one second downstream frame. Alternatively, the OLT may send the second instruction information, the second path identifier, and the second timeslot indication information to the to-be-activated ONU by using a plurality of second downstream frames together.

For descriptions of a specific manner in which the OLT sends the second downstream frame to the to-be-activated ONU, refer to the specific manner in which the OLT sends the first downstream frame to the activated ONU in the embodiment shown in FIG. 3. Details are not described again. In this embodiment, an example in which there is one second downstream frame is used for description.

The following describes the first upstream wavelength path and the second upstream wavelength path in the embodiments.

To reduce the latency of communication between the OLT and the ONUs, the first upstream wavelength path and the second upstream wavelength path in the embodiments do not interfere with each other. Optionally, that the first upstream wavelength path and the second upstream wavelength path do not interfere with each other is as follows. If the first upstream wavelength path and the second upstream wavelength path are located in a same fiber, a wavelength corresponding to the first upstream wavelength path and a wavelength corresponding to the second upstream wavelength path are different from each other. Optionally, the first upstream wavelength path and the second upstream wavelength path are located in different fibers.

When the first upstream wavelength path and the second upstream wavelength path do not interfere with each other, the OLT may implement different functions by using the first upstream wavelength path and the second upstream wavelength path. Specifically, the OLT may receive the upstream service data from the activated ONU by using the first upstream wavelength path. The OLT may further receive the registration request message from the to-be-activated ONU by using the second upstream wavelength path, and the OLT may perform ranging and registration on the to-be-activated ONU based on the registration request message received by using the second upstream wavelength path.

It may be learned that, a plurality of upstream wavelength paths included between the OLT and the ONUs include the first upstream wavelength path and the second upstream wavelength path that do not interfere with each other and that are different from each other. The OLT receives the registration request message from the to-be-activated ONU only on the second upstream wavelength path, and normally receives the upstream service data from the activated ONU on the first upstream wavelength path. For better understanding, the following uses an example for description with reference to FIG. 5.

Figure 5:
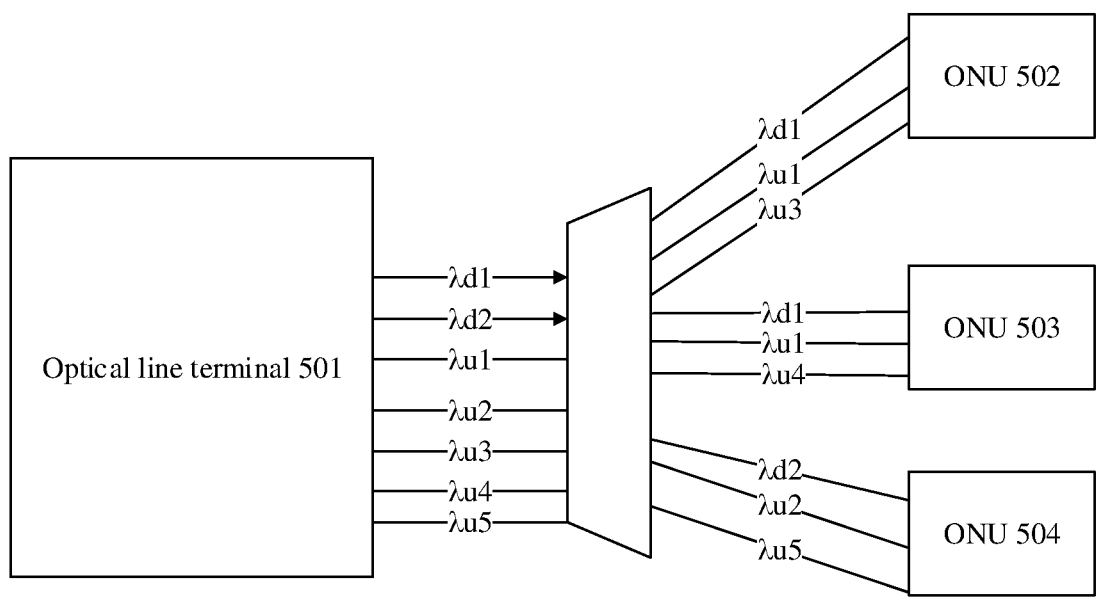
FIG. 5 is still another example diagram of a network architecture of a passive optical network to which a communication method according to this application is applied.

A PON shown in FIG. 5 includes a first upstream wavelength path and a second upstream wavelength path that do not interfere with each other, and the PON includes an OLT 501 and a plurality of ONUs. As shown in FIG. 5, that three ONUs are included is used as an example for description, that is, the PON shown in FIG. 5 includes an ONU 502, an ONU 503, and an ONU 504. The ONU 502 and the ONU 503 are activated ONUs on which registration and ranging have been completed.

The OLT sends a first downstream frame to the ONU 502 and the ONU 503 by using a downstream wavelength path λd1. The ONU 502 and the ONU 503 may transmit upstream service data on a first upstream wavelength path λu1 indicated by the first downstream frame. The OLT further sends a second downstream frame to the ONU 504 by using a downstream wavelength path λd2. The ONU 504 may transmit a registration request message on a second upstream wavelength path λu2 indicated by the second downstream frame. In addition, in the method in this embodiment, the OLT does not indicate a to-be-activated ONU to send the registration request message by using the first upstream wavelength path, that is, any ONU included in the PON does not send the registration request message on the first upstream wavelength path. The OLT does not indicate the activated ONU to send the upstream service data by using the second upstream wavelength path, either.

Step 402: The to-be-activated ONU receives the second downstream frame.

For a specific process in which the to-be-activated ONU receives the second downstream frame in this embodiment, refer to the specific process in which the ONU receives the first downstream frame shown in FIG. 3. Details are not described again in this embodiment.

Step 403: The to-be-activated ONU sends the registration request message to the OLT by using the second upstream wavelength path.

In this embodiment, when the to-be-activated ONU receives the second downstream frame, the to-be-activated ONU may decapsulate one or more second downstream frames to obtain the second path identifier, the second instruction information, and the second timeslot indication information.

The to-be-activated ONU may send the registration request message based on the information included in the second downstream frame. Specifically, the ONU sends the upstream service data to the OLT within a time range of the registration start-stop timeslot by using the second upstream wavelength path identified by the second path identifier.

Step 404: The OLT receives the registration request message from the to-be-activated ONU by using the second upstream wavelength path.

Step 405: The OLT completes ranging and registration on the to-be-activated ONU based on the registration request message.

When the OLT in this embodiment receives the registration request message sent by the to-be-activated ONU, the OLT may allocate first instruction information to the to-be-activated ONU. For specific descriptions of the first instruction information, refer to the embodiment shown in FIG. 3. Details are not described again.

When the OLT allocates the first instruction information to the to-be-activated ONU, the OLT may complete registration and ranging on the to-be-activated ONU. In a process of completing registration and ranging on the to-be-activated ONU, the to-be-activated ONU is switched to an activated ONU. The activated ONU may transmit upstream service data based on an indication in a first downstream frame sent by the OLT. For descriptions of a process in which the activated ONU transmits the upstream service data, refer to the embodiment shown in FIG. 3. Details are not described again in this embodiment.

It may be learned that in the communication method in this embodiment, a process in which the to-be-activated ONU sends the registration request message to the OLT is not stopped in a process in which the activated ONU sends the upstream service data to the OLT. In addition, the process in which the activated ONU sends the upstream service data to the OLT is not stopped either in the process in which the to-be-activated ONU sends the registration request message to the OLT. It may be learned that the upstream service data and the registration request message may be separately transmitted to the OLT by using two upstream wavelength paths that do not interfere with each other. Therefore, efficiency of sending the upstream service data to the OLT is effectively improved, and a latency of transmitting the upstream service data to the OLT is reduced.

Figure 6:
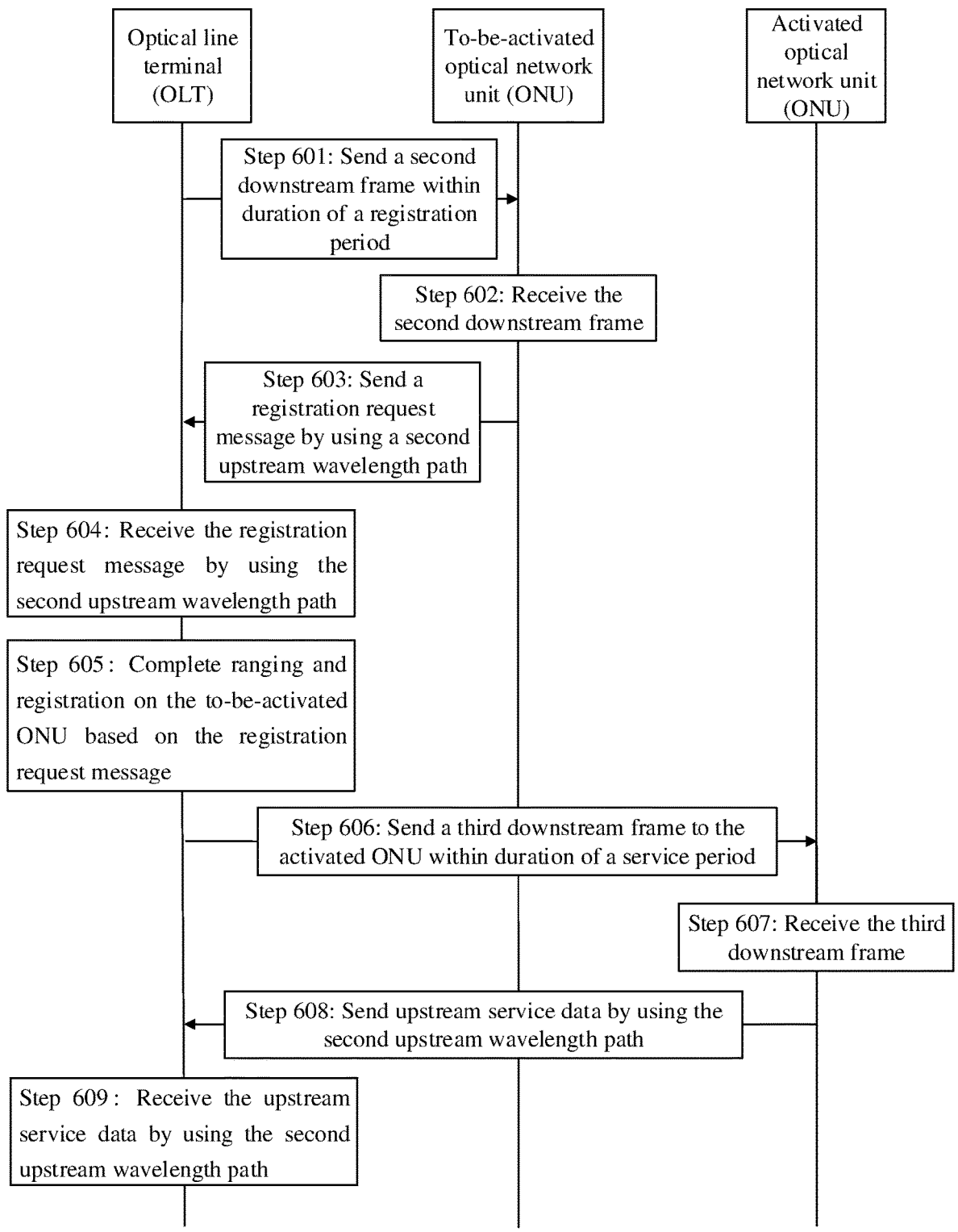
FIG. 6 is a flowchart of steps of a communication method according to still another embodiment of this application.

Based on the embodiment shown in FIG. 4, the following describes, by using an embodiment shown in FIG. 6, how to effectively improve transmission efficiency of upstream service data to improve bandwidth utilization of a PON.

Step 601: An OLT sends a second downstream frame to a to-be-activated ONU within duration of a registration period.

In this embodiment, a registration period and a service period that correspond to a second upstream wavelength path may be preset on the OLT. Specific quantities of registration periods and service periods that are preset on the OLT are not limited in this embodiment, provided that there are one or more registration periods and there are also one or more service periods.

A magnitude of duration of each of the registration period and the service period is not limited in this embodiment. To improve a data amount of upstream service data sent by an ONU to the OLT in a unit of time to effectively improve the bandwidth utilization of the PON, in this embodiment, the registration period and the service period are set at intervals, and the duration of the registration period is less than the duration of the service period.

In this embodiment, the OLT may send the second downstream frame to the to-be-activated ONU in the registration period by using at least one downstream wavelength path. For descriptions of a specific process in which the OLT sends the second downstream frame and specific descriptions of the second downstream frame, refer to step 401 shown in FIG. 4. Details are not described again in this embodiment.

Step 602: The to-be-activated ONU receives the second downstream frame.

Step 603: The to-be-activated ONU sends a registration request message to the OLT by using the second upstream wavelength path.

Step 604: The OLT receives the registration request message from the to-be-activated ONU by using the second upstream wavelength path.

Step 605: The OLT completes ranging and registration on the to-be-activated ONU based on the registration request message.

For a specific performing process of step 602 to step 605 in this embodiment, refer to step 402 to step 405 shown in FIG. 4. The specific performing process is not described again.

Step 606: The OLT sends a third downstream frame to an activated ONU within the duration of the service period.

The activated ONU in this embodiment may be a to-be-activated ONU on which registration and ranging are completed by using step 601 to step 605, or may be any ONU on which registration and ranging have been completed in the PON. This is not specifically limited in this embodiment.

In this embodiment, one or more third downstream frames may be used to carry first instruction information, a second path identifier, and third timeslot indication information. For a specific carrying process, refer to the descriptions of the manner in which the first downstream frame carries information shown in FIG. 3. Details are not described again.

The third timeslot indication information is used to indicate a service start-stop timeslot, and the service start-stop timeslot is a start-stop timeslot used to transmit the upstream service data. For specific descriptions of the third timeslot indication information, refer to the specific descriptions of the first timeslot indication information shown in FIG. 3. Details are not described again.

For a specific process in which the OLT sends the third downstream frame to the activated ONU, refer to the specific process in which the OLT sends the first downstream frame to the activated ONU shown in FIG. 3. Details are not described again.

Step 607: The activated ONU receives the third downstream frame.

For a specific performing process of step 607 shown in this embodiment, refer to step 302 shown in FIG. 3. The specific performing process is not described in this embodiment.

Step 608: The activated ONU sends the upstream service data to the OLT by using the second upstream wavelength path.

In this embodiment, when the activated ONU receives the third downstream frame, the activated ONU may decapsulate the third downstream frame to obtain the second path identifier and the third timeslot indication information that are included in the first downstream frame.

The activated ONU may send an upstream service data based on the information included in the third downstream frame. Specifically, the activated ONU sends the upstream service data to the OLT within a time range of the service start-stop timeslot by using the second upstream wavelength path identified by the second path identifier.

Step 609: The OLT receives the upstream service data from the activated ONU by using the second upstream wavelength path.

For better understanding, the following uses different periods to provide compare descriptions of actions performed by the OLT.

In the foregoing registration period, operations performed by the OLT are as follows.

The OLT sends a first downstream frame to an activated ONU, and receives upstream service data from the activated ONU by using a first upstream wavelength path.

The OLT sends a second downstream frame to a to-be-activated ONU, and receives a registration request message from the to-be-activated ONU by using a second upstream wavelength path.

In the foregoing service period, operations performed by the OLT are as follows.

The OLT sends the first downstream frame to a first ONU, and receives upstream service data from the first ONU by using the first upstream wavelength path.

The OLT sends a third downstream frame to a second ONU, and receives a registration request message from the second ONU by using the second upstream wavelength path. The first ONU and the second ONU are different from each other, and both are activated ONUs.

It may be learned that, when the second upstream wavelength path corresponds to at least one registration period and at least one service period, the OLT may perform registration and ranging on the to-be-activated ONU within the duration of the registration period. When the duration of the registration period expires, the OLT indicates, within the duration of the service period, the activated ONU to send the upstream service data to the OLT. Therefore, a case in which the second upstream wavelength path is only used to transmit the second downstream frame when there is no to-be-activated ONU in the PON is avoided, a waste of bandwidth resources on the second upstream wavelength path is effectively avoided, bandwidth resource utilization of the PON is improved, and a data amount of upstream service data sent by the ONU to the OLT is improved.

Figure 7:
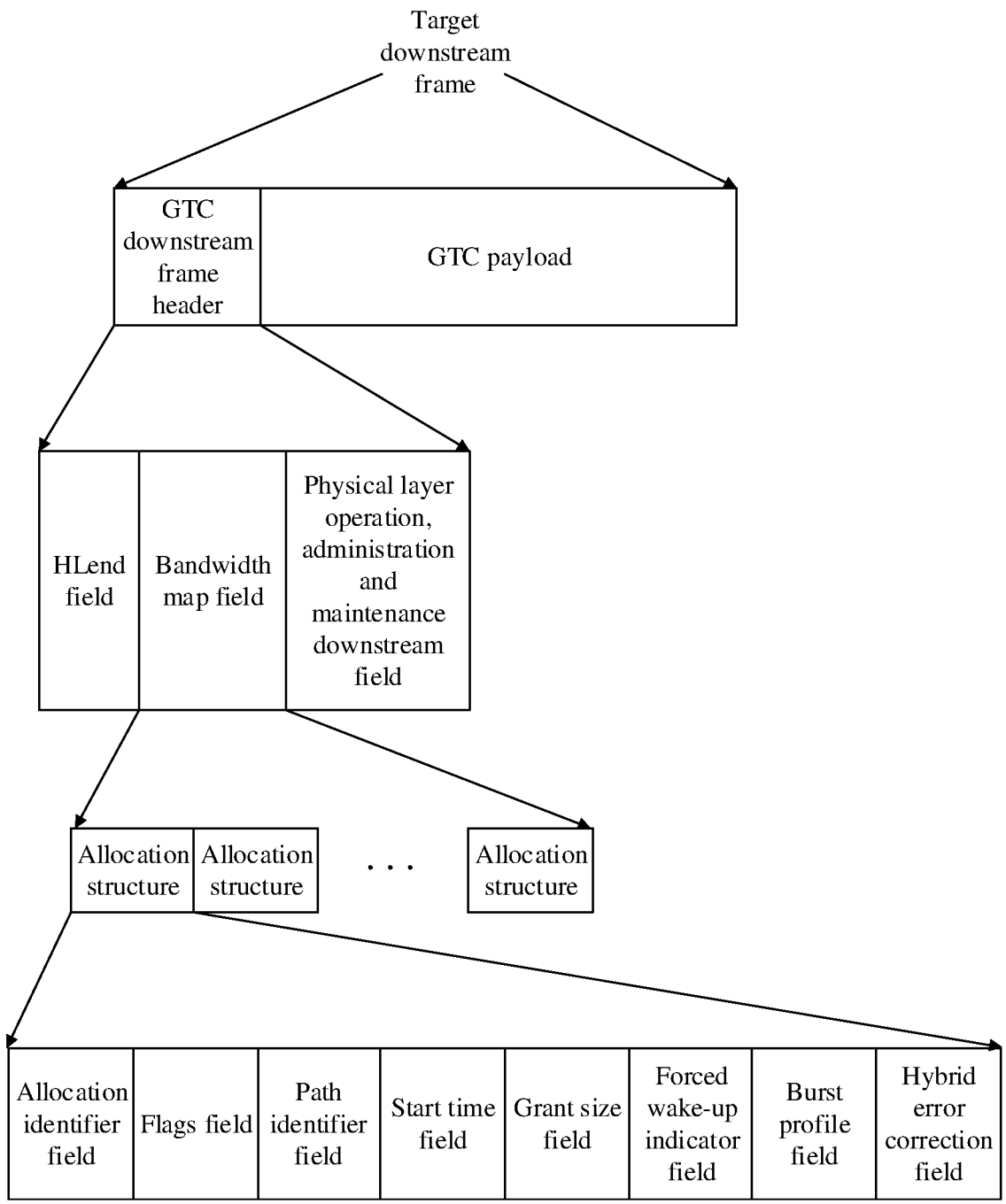
FIG. 7 is an example diagram of a frame structure of a downstream frame according to this application.

With reference to FIG. 7, the following describes a specific frame structure of a downstream frame provided in an embodiment. The downstream frame in this embodiment may be one of the first downstream frame, the second downstream frame, or the third downstream frame in the foregoing embodiments. An example in which the downstream frame in this embodiment is a GTC downstream frame is used. FIG. 7 is a schematic diagram of an embodiment of a frame structure of a GTC downstream frame. The GTC frame in this embodiment may be of another type such as XGTC. This is not specifically limited.

The GTC downstream frame includes a GTC downstream frame header and a GTC payload. The GTC downstream frame header may include an HLend field, a bandwidth map (BWmap) field, and a physical layer operation, administration and maintenance downstream (PLOAMd) field.

The BWmap field may include a plurality of allocation structures. Each allocation structure includes a path identifier field, an allocation identifier (Alloc-ID) field, a flags field, a start time field, a grant size field, a forced wake-up indicator (FWI) field, a burst profile field, and a hybrid error correction (HEC) field.

Optionally, if the downstream frame is the first downstream frame, the allocation identifier field is used to carry first instruction information, and the first instruction information is used to instruct an ONU to send upstream service data to an OLT. For specific descriptions of the first instruction information, refer to the foregoing descriptions. Details are not described again.

The path identifier field included in the first downstream frame is used to carry a first path identifier. For specific descriptions of the first path identifier, refer to the foregoing descriptions. Details are not described again.

The start time field and the grant size field are jointly used to carry first timeslot indication information, and the first timeslot indication information is used to indicate a service start-stop timeslot. Specifically, information carried in the start time field is used to indicate a start time point of the service start-stop timeslot, and information carried in the grant size field is used to indicate duration of the service start-stop timeslot. The service start-stop timeslot is a start-stop timeslot used to transmit the upstream service data. Specifically, when the ONU receives the first downstream frame, the ONU that has the first path identifier may send the upstream service data to the OLT within the duration of the service start-stop timeslot by using a first upstream wavelength path identified by the first path identifier.

Optionally, if the downstream frame is the second downstream frame, the allocation identifier field is used to carry second instruction information, the second instruction information is used to instruct a to-be-activated ONU to be registered at an OLT, and the path identifier field is used to carry a second path identifier. For specific descriptions of the second instruction information and the second path identifier, refer to the foregoing descriptions. Details are not described again.

The start time field and the grant size field are jointly used to carry second timeslot indication information, and the second timeslot indication information is used to indicate a registration start-stop timeslot. Specifically, information carried in the start time field is used to indicate a start time point of the registration start-stop timeslot, and information carried in the grant size field is used to indicate duration of the registration start-stop timeslot. The registration start-stop timeslot is a start-stop timeslot used to transmit a registration request message. Specifically, the to-be-activated ONU may respond to the second downstream frame. The to-be-activated ONU sends the registration request message to the OLT within the duration of the registration start-stop timeslot by using a second upstream wavelength path identified by the second path identifier.

Optionally, if the downstream frame is the third downstream frame, the allocation identifier field is used to carry first instruction information, the first instruction information is used to instruct an activated ONU to send upstream service data to an OLT, and the path identifier field is used to carry a second path identifier. For specific descriptions of the first instruction information and the second path identifier, refer to the foregoing descriptions. Details are not described again.

The start time field and the grant size field are jointly used to carry third timeslot indication information, the third timeslot indication information is used to indicate a service start-stop timeslot, and the service start-stop timeslot is a start-stop timeslot used to transmit the upstream service data from the activated ONU. Specifically, information carried in the start time field is used to indicate a start time point of the service start-stop timeslot, and information carried in the grant size field is used to indicate duration of the service start-stop timeslot.

Specifically, when the activated ONU receives the third downstream frame, the ONU that has the second path identifier may send the upstream service data to the OLT within the duration of the service start-stop timeslot by using a second upstream wavelength path identified by the second path identifier.

The following describes a specific structure of the allocation structure of the downstream frame in this embodiment.

The specific structure of the allocation structure of the downstream frame in this embodiment may include the following two manners.

Manner 1

Figure 8:
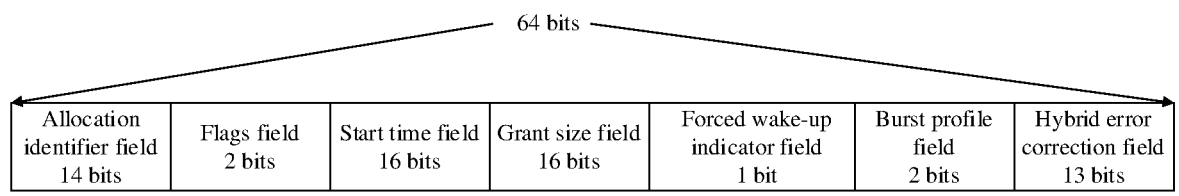
FIG. 8 is an example diagram of a specific structure of an allocation structure of an existing GTC downstream frame.
Figure 9:
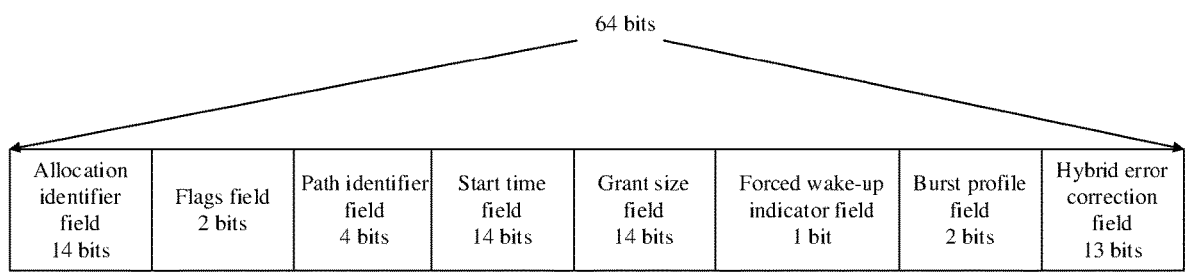
FIG. 9 is an example diagram of a structure of an embodiment of an allocation structure of a downstream frame according to this application.

FIG. 8 is an example diagram of a specific structure of an allocation structure of an existing GTC downstream frame, and FIG. 9 is an example structural diagram of an embodiment of an allocation structure of a downstream frame according to this application.

It may be learned from FIG. 8 that a bit length of the allocation structure of the GTC downstream frame in an existing solution is 64 bits in total. A bit length of an allocation identifier (Alloc-ID) field is 14 bits, a bit length of a flags field is 2 bits, a bit length of a start time field is 16 bits, a bit length of a grant size field is 16 bits, a bit length of a forced wake-up indicator (FWI) field is 1 bit, a bit length of a burst profile field is 2 bits, and a bit length of a hybrid error correction (HEC) field is 13 bits.

A bit length of the allocation structure of the downstream frame provided in this embodiment is also 64 bits. It may be learned that the bit length of the allocation structure of the downstream frame in this embodiment is not increased relative to the bit length of the allocation structure of the GTC downstream frame in the existing solution (shown in FIG. 8). To implement the communication method in the foregoing method embodiments, the path identifier field used to indicate the first upstream wavelength path or the second upstream wavelength path can be further added without increasing the bit length of the allocation structure of the downstream frame in this embodiment.

For the specific structure of the allocation structure of the downstream frame in this embodiment, refer to FIG. 9. It may be learned from FIG. 9 that, a bit length of the path identifier field added to the allocation structure of the downstream frame is 4 bits, a bit length of an allocation identifier (Alloc-ID) field is 14 bits, a bit length of a flags field is 2 bits, a bit length of a start time field is 14 bits, a bit length of a grant size field is 14 bits, a bit length of a forced wake-up indicator (FWI) field is 1 bit, a bit length of a burst profile field is 2 bits, and a bit length of a hybrid error correction (HEC) field is 13 bits.

It may be learned that, to indicate the registration start-stop timeslot or the service start-stop timeslot by using the start-time field and the grant size field jointly, the start-time field requires a maximum of only 14 bits, and the grant size field requires a maximum of only 14 bits. To be specific, 2 invalid bits that are set in each of the existing start-time field and the existing grant size field are reset as the path identifier field. It may be learned that the bit lengths of both the start time field and the grant size field in the downstream frame in this embodiment may be set to 14 bits. When the bit length of the allocation structure of the downstream frame in this embodiment is not changed relative to the bit length of the allocation structure of the GTC downstream frame shown in FIG. 8, the bit length of the added path identifier field may be set to 4 bits in this embodiment.

When the bit length of the allocation structure of the downstream frame in this embodiment is not increased relative to the bit length of the allocation structure of the GTC downstream frame in the existing solution, a bit length of another field included in the GTC downstream frame in the existing solution may be reduced, and a bit length obtained after reduction is allocated to the path identifier field.

Manner 2

Figure 10:
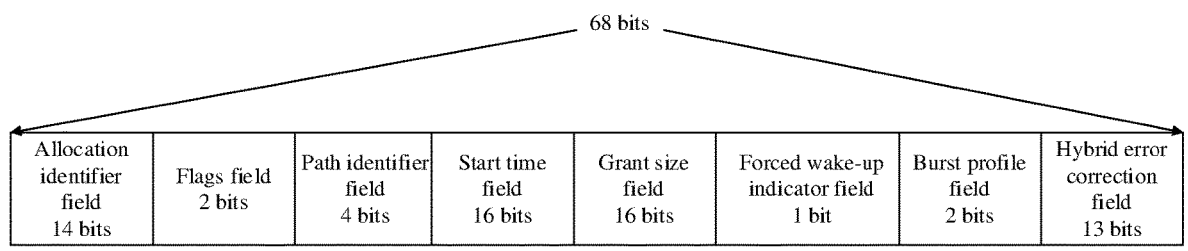
FIG. 10 is an example diagram of a structure of another embodiment of an allocation structure of a downstream frame according to this application.

For the specific structure of the allocation structure of the downstream frame in this embodiment, refer to FIG. 10. A bit length of the allocation structure of the downstream frame is increased relative to the bit length of the allocation structure of the GTC downstream frame in the existing solution shown in FIG. 8, and an added bit length is set as the path identifier field. With reference to FIG. 8 and FIG. 10, it may be learned that the bit length of the allocation structure of the downstream frame in this embodiment is 68 bits, and 4 bits are added to 64 bits of the allocation structure of the GTC downstream frame in the existing solution. In this embodiment shown in FIG. 10, the added 4 bits are set as the path identifier field. It may be learned that a bit length of the path identifier field shown in FIG. 10 is 4 bits.

In the allocation structure of the downstream frame in this embodiment, a bit length of an allocation identifier (Alloc-ID) field is 14 bits, a bit length of a flags field is 2 bits, a bit length of a start time field is 16 bits, a bit length of a grant size field is 16 bits, a bit length of a forced wake-up indicator (FWI) field is 1 bit, a bit length of a burst profile field is 2 bits, and a bit length of a hybrid error correction (HEC) field is 13 bits. It should be noted that a specific bit length of the path identifier field is not limited in this manner.

Figure 11:
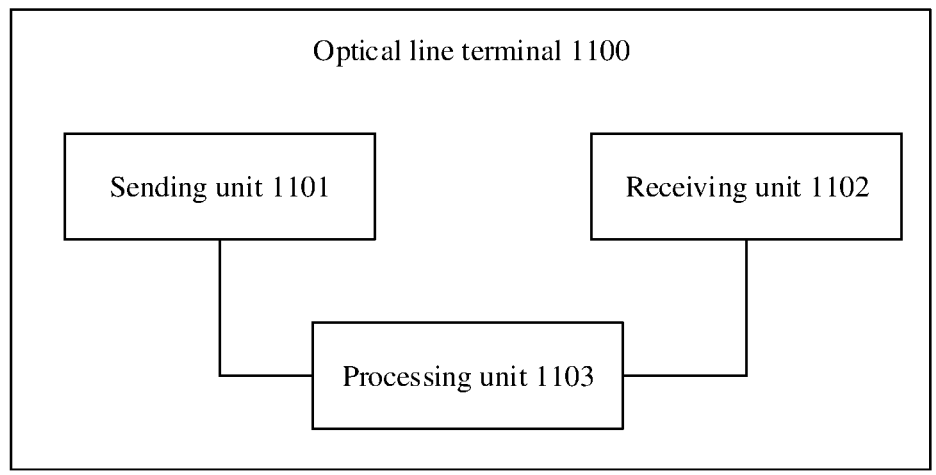
FIG. 11 is an example diagram of a structure of an embodiment of an optical line terminal according to this application.

With reference to FIG. 11, the following uses an example to describe a specific structure of an optical line terminal in this application. The optical line terminal is configured to execute the procedure executed by the optical line terminal in the foregoing method embodiments. For a specific execution process, refer to the foregoing method embodiments. An optical line terminal 1100 in an embodiment specifically includes a sending unit 1101, configured to send a first downstream frame to an activated ONU by using at least one downstream wavelength path, where the first downstream frame includes a first path identifier used to identify a first upstream wavelength path, and the first upstream wavelength path is one of a plurality of upstream wavelength paths, and a receiving unit 1102, configured to receive upstream service data from the activated ONU by using the first upstream wavelength path.

For descriptions of a specific process in which the optical line terminal in this embodiment performs the foregoing method embodiments and beneficial effects obtained by performing the foregoing method embodiments, refer to the foregoing descriptions. Details are not described again in this embodiment.

Optionally, a plurality of ONUs further include a to-be-activated ONU, and the sending unit 1101 is further configured to send a second downstream frame to the to-be-activated ONU by using the at least one downstream wavelength path, where the second downstream frame includes a second path identifier used to identify a second upstream wavelength path, and the first upstream wavelength path and the second upstream wavelength path in the plurality of upstream wavelength paths do not interfere with each other, the receiving unit 1102 is further configured to receive a registration request message from the to-be-activated ONU by using the second upstream wavelength path, and the OLT further includes a processing unit 1103, where the processing unit 1103 is configured to complete ranging and registration on the to-be-activated ONU based on the registration request message.

Optionally, the second upstream wavelength path corresponds to at least one registration period and at least one service period, and the sending unit 1101 is further configured to send the second downstream frame to the to-be-activated ONU within duration of the registration period by using the at least one downstream wavelength path, and send a third downstream frame to the activated ONU in the service period by using the at least one downstream wavelength path, where the third downstream frame includes the second path identifier, and the second upstream wavelength path is used to transmit upstream service data from the activated ONU.

Figure 12:
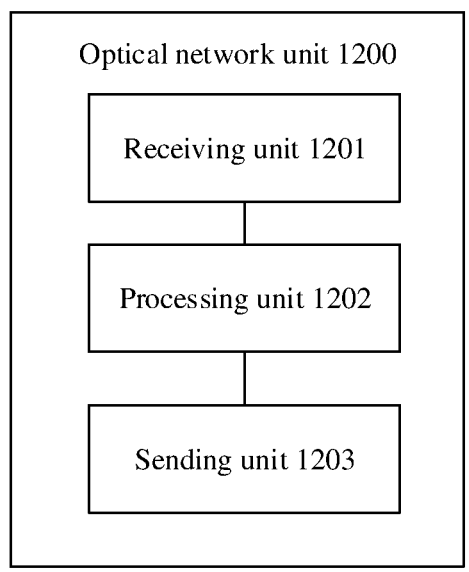
FIG. 12 is an example diagram of a structure of an embodiment of an optical network unit according to this application.

With reference to FIG. 12, the following uses an example to describe a specific structure of an optical network unit in this application. The optical network unit is configured to execute the procedure executed by the optical network unit in the foregoing method embodiments. For descriptions of a specific execution process and beneficial effects, refer to the foregoing method embodiments. An optical network unit 1200 in an embodiment specifically includes a receiving unit 1201, configured to receive a first downstream frame from an OLT by using at least one downstream wavelength path, where the first downstream frame includes a first path identifier used to identify a first upstream wavelength path, and the first upstream wavelength path is one of a plurality of upstream wavelength paths, a processing unit 1202, configured to determine the first upstream wavelength path based on the first path identifier, and a sending unit 1203, configured to send upstream service data to the OLT by using the first upstream wavelength path.

Optionally, if the ONU is a to-be-activated ONU, the receiving unit 1201 is further configured to receive a second downstream frame from the OLT by using the at least one downstream wavelength path, where the second downstream frame includes a second path identifier used to identify a second upstream wavelength path, and the first upstream wavelength path and the second upstream wavelength path in the plurality of upstream wavelength paths do not interfere with each other, and the sending unit 1203 is further configured to send a registration request message to the OLT by using the second upstream wavelength path.

Optionally, if the ONU is an activated ONU, the receiving unit 1201 is further configured to receive a third downstream frame from the OLT by using the at least one downstream wavelength path, where the third downstream frame includes the second path identifier, and the second upstream wavelength path is used to transmit upstream service data from the activated ONU.

Figure 13:
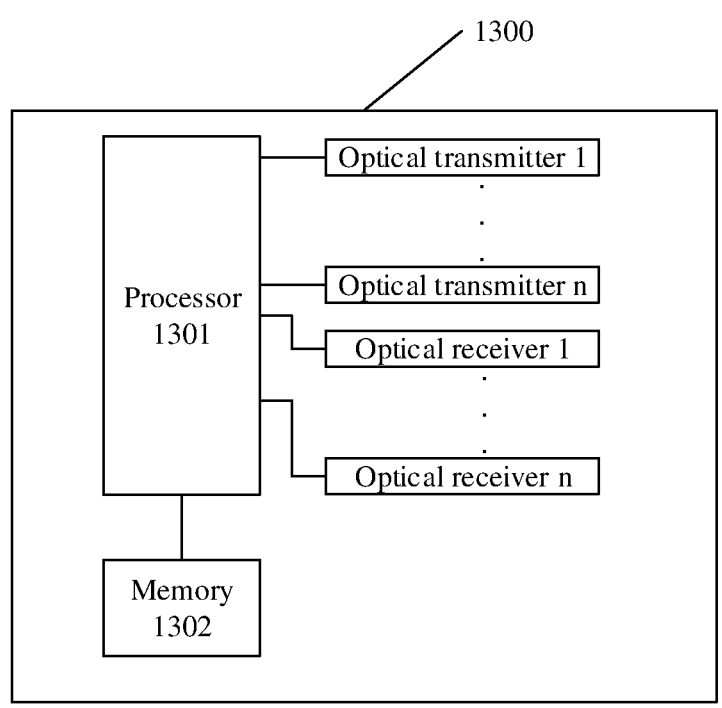
FIG. 13 is an example diagram of a structure of an embodiment of an optical line terminal or an optical network unit according to this application.

FIG. 13 is a schematic diagram of a structure of an OLT according to this application. The OLT in an embodiment is configured to implement a function implemented by the OLT in the foregoing method embodiments. For details, refer to the descriptions in the foregoing method embodiments.

An OLT 1300 includes a processor 1301, a memory 1302, n optical transmitters, and n optical receivers. A specific value of n is not limited in this embodiment. The processor 1301 and the memory 1302 are interconnected by using a line, and the processor 1301 and both the n optical transmitters and the n optical receivers are further interconnected.

Specifically, the optical transmitter is configured to send a first downstream frame to an activated ONU by using at least one downstream wavelength path, where the first downstream frame includes a first path identifier used to identify a first upstream wavelength path, and the first upstream wavelength path is one of a plurality of upstream wavelength paths, and the optical receiver is configured to receive upstream service data from the activated ONU by using the first upstream wavelength path.

The optical transmitter is further configured to send a second downstream frame to a to-be-activated ONU by using the at least one downstream wavelength path, where the second downstream frame includes a second path identifier used to identify a second upstream wavelength path, and the first upstream wavelength path and the second upstream wavelength path in the plurality of upstream wavelength paths do not interfere with each other, the optical receiver is further configured to receive a registration request message from the to-be-activated ONU by using the second upstream wavelength path, and the processor 1301 is configured to invoke program code stored in the memory 1302, to perform completing ranging and registration on the to-be-activated ONU based on the registration request message.

The transmitter is further configured to send the second downstream frame to the to-be-activated ONU within duration of a registration period by using the at least one downstream wavelength path, and send a third downstream frame to the activated ONU in a service period by using the at least one downstream wavelength path, where the third downstream frame includes the second path identifier, and the second upstream wavelength path is used to transmit upstream service data from the activated ONU.

In another possible implementation, FIG. 13 may be a schematic structural diagram of an ONU.

Specifically, the optical receiver is configured to receive a first downstream frame from an OLT by using at least one downstream wavelength path, where the first downstream frame includes a first path identifier used to identify a first upstream wavelength path, and the first upstream wavelength path is one of a plurality of upstream wavelength paths, the processor 1301 is configured to invoke program code stored in the memory 1302, to perform determining the first upstream wavelength path based on the first path identifier, and the optical transmitter is configured to send upstream service data to the OLT by using the first upstream wavelength path.

The optical receiver is further configured to receive a second downstream frame from the OLT by using the at least one downstream wavelength path, where the second downstream frame includes a second path identifier used to identify a second upstream wavelength path, and the first upstream wavelength path and the second upstream wavelength path in the plurality of upstream wavelength paths do not interfere with each other, and the optical transmitter is further configured to send a registration request message to the OLT by using the second upstream wavelength path.

The optical receiver is further configured to receive a third downstream frame from the OLT by using the at least one downstream wavelength path, where the third downstream frame includes the second path identifier, and the second upstream wavelength path is used to transmit upstream service data from an activated ONU.

An embodiment of this application further provides a digital processing chip. A circuit and one or more interfaces that are configured to implement functions of the foregoing processor 1301 are integrated into the chip. When a memory is integrated into the digital processing chip, the digital processing chip may complete the method steps in any one or more of the foregoing embodiments. When a memory is not integrated into the digital processing chip, the digital processing chip may be connected to an external memory through a communications interface. The digital processing chip implements, based on program code stored in the external memory, the actions performed by the ONU or a convergent device in the foregoing embodiments.

An embodiment of this application further provides a passive optical network system, including an OLT configured to perform the foregoing method embodiments and one or more ONUs configured to perform the foregoing method embodiments. For a specific execution process, refer to the foregoing descriptions.

An embodiment of this application further provides a computer-readable storage medium, including instructions. When the instructions are run on a computer, the computer is enabled to perform the communication method in the foregoing method embodiments.

An embodiment of this application provides a computer program product including instructions. When the computer program product is run on a computer, the computer is enabled to perform the communication method provided in the foregoing embodiments.

The embodiments in this specification are all described in a progressive manner. For same or similar parts in the embodiments, refer to these embodiments. Each embodiment focuses on a difference from other embodiments. Especially, a device embodiment is basically similar to a method embodiment, and therefore is described briefly. For related parts, refer to partial descriptions in the method embodiment.

A person of ordinary skill in the art may understand that all or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions. When the computer instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A communication method, comprising:
sending, by an optical line terminal (OLT) of a passive optical network that comprises the OLT and a plurality of optical network units (ONUs), a first downstream frame to an activated ONU using at least one downstream wavelength path, wherein the activated ONU is one of the plurality of ONUs, the OLT and at least one ONU of the plurality of ONUs communicate with each other using the at least one downstream wavelength path and a plurality of upstream wavelength paths, wherein the first downstream frame comprises a first path identifier used to identify a first upstream wavelength path, and wherein the first upstream wavelength path is one of the plurality of upstream wavelength paths, and the first upstream wavelength path is selected by the OLT independently of the at least one downstream wavelength path; and
receiving, by the OLT, upstream service data from the activated ONU using the first upstream wavelength path.

2. The method according to claim 1, wherein the plurality of ONUs further comprises a to-be-activated ONU; and wherein the method further comprises:
sending, by the OLT, a second downstream frame to the to-be-activated ONU using the at least one downstream wavelength path, wherein the second downstream frame comprises a second path identifier identifying a second upstream wavelength path, and wherein the first upstream wavelength path and the second upstream wavelength path in the plurality of upstream wavelength paths avoid interfering with each other;
receiving, by the OLT, a registration request message from the to-be-activated ONU using the second upstream wavelength path; and
completing, by the OLT, ranging and registration on the to-be-activated ONU based on the registration request message.

3. The method according to claim 2, wherein the first upstream wavelength path and the second upstream wavelength path in the plurality of upstream wavelength paths avoiding interfering with each other comprises:
the first upstream wavelength path and the second upstream wavelength path being located in a same fiber, and a wavelength corresponding to the first upstream wavelength path and a wavelength corresponding to the second upstream wavelength path being different from each other; or
the first upstream wavelength path and the second upstream wavelength path being located in different fibers.

4. The method according to claim 2, wherein the second upstream wavelength path corresponds to at least one registration period and at least one service period;
wherein sending the second downstream frame to the to-be-activated ONU comprises:
sending, by the OLT, the second downstream frame to the to-be-activated ONU within a duration of the at least one registration period using the at least one downstream wavelength path; and
wherein the method further comprises:
sending, by the OLT, a third downstream frame to the activated ONU in the service period using the at least one downstream wavelength path, wherein the third downstream frame comprises the second path iden-
tifier, and wherein the second upstream wavelength path is used to transmit the upstream service data from the activated ONU.

5. The method according to claim 1, wherein an allocation structure of a downstream frame comprises an allocation identifier field and a path identifier field.

6. The method according to claim 5, wherein the allocation identifier field carries first instruction information in response to the downstream frame being the first downstream frame, wherein the first instruction information instructs the activated ONU to send the upstream service data to the OLT in response to the downstream frame being the first downstream frame, and wherein the path identifier field carries the first path identifier in response to the downstream frame being the first downstream frame.

7. The method according to claim 5, wherein the allocation identifier field carries second instruction information in response to the downstream frame being a second downstream frame, wherein the second instruction information instructs a to-be-activated ONU to be registered at the OLT in response to the downstream frame being the second downstream frame, and wherein the path identifier field carries a second path identifier in response to the downstream frame being the second downstream frame.

8. The method according to claim 5, wherein the downstream frame is a third downstream frame, wherein the allocation identifier field carries first instruction information, wherein the first instruction information instructs the activated ONU to send the upstream service data to the OLT, and wherein the path identifier field carries a second path identifier.

9. The method according to claim 5, wherein the allocation structure of the downstream frame further comprises a start time field and a grant size field; and
wherein a bit length of the allocation structure of the downstream frame is 64 bits, bit lengths of the start time field and the grant size field each are 14 bits, and a bit length of the path identifier field is 4 bits, or wherein the bit length of the allocation structure of the downstream frame is greater than 64 bits, and the bit lengths of the start time field and the grant size field each are 16 bits.

10. A communication method based on a passive optical network, comprising:
receiving, by an optical network unit (ONU) of a plurality of ONUs of a passive optical network that comprises an optical line terminal (OLT) and the plurality of ONUs, a first downstream frame from the OLT using at least one downstream wavelength path, wherein the OLT and the ONU communicate with each other using the at least one downstream wavelength path and a plurality of upstream wavelength paths, wherein the first downstream frame comprises a first path identifier that identifies a first upstream wavelength path, wherein the first upstream wavelength path is one of the plurality of upstream wavelength paths, and selection of the first upstream wavelength path is independent of the at least one downstream wavelength path, and wherein the ONU is an activated ONU;
determining, by the ONU, the first upstream wavelength path based on the first path identifier; and
sending, by the ONU, upstream service data to the OLT using the first upstream wavelength path.

11. The method according to claim 10, further comprising performing, in response to the ONU being a to-be-activated ONU:
receiving, by the ONU, a second downstream frame from the OLT using the at least one downstream wavelength path, wherein the second downstream frame comprises a second path identifier identifying a second upstream wavelength path, and wherein the first upstream wavelength path and the second upstream wavelength path in the plurality of upstream wavelength paths avoid interfering with each other; and
sending, by the ONU, a registration request message to the OLT using the second upstream wavelength path.

12. The method according to claim 11, wherein the first upstream wavelength path and the second upstream wavelength path in the plurality of upstream wavelength paths avoiding interfering with each other comprises:
the first upstream wavelength path and the second upstream wavelength path being located in a same fiber, and a wavelength corresponding to the first upstream wavelength path and a wavelength corresponding to the second upstream wavelength path being different from each other; or
the first upstream wavelength path and the second upstream wavelength path being located in different fibers.

13. The method according to claim 11, further comprising:
receiving, by the ONU, a third downstream frame from the OLT using the at least one downstream wavelength path, wherein the third downstream frame comprises the second path identifier, and wherein the second upstream wavelength path is used to transmit the upstream service data from the activated ONU.

14. The method according to claim 10, wherein an allocation structure of a downstream frame comprises an allocation identifier field and a path identifier field.

15. The method according to claim 14, wherein the allocation identifier field carries first instruction information in response to the downstream frame being the first downstream frame, wherein the first instruction information instructs the activated ONU to send the upstream service data to the OLT in response to the downstream frame being the first downstream frame, and wherein the path identifier field carries the first path identifier in response to the downstream frame being the first downstream frame.

16. The method according to claim 14, wherein the allocation identifier field carries second instruction information in response to the downstream frame being a second downstream frame, wherein the second instruction information instructs a to-be-activated ONU to be registered at the OLT in response to the downstream frame being the second downstream frame, and wherein the path identifier field carries a second path identifier in response to the downstream frame being the second downstream frame.

17. The method according to claim 14, wherein the allocation identifier field carries first instruction information in response to the downstream frame being a third downstream frame, wherein the first instruction information instructs, in response to the downstream frame being the third downstream frame, the activated ONU to send the upstream service data to the OLT, and wherein the path identifier field carries a second path identifier in response to the downstream frame being the third downstream frame.

18. An optical line terminal (OLT), comprising:
a transmitter, configured to send a first downstream frame to an activated optical network unit (ONU) using at least one downstream wavelength path, wherein the OLT and the activated ONU communicate with each other using the at least one downstream wavelength path and a plurality of upstream wavelength paths, wherein the first downstream frame comprises a first path identifier used to identify a first upstream wavelength path, the first upstream wavelength path is one of the plurality of upstream wavelength paths, and the first upstream wavelength path is selected by the OLT independently of the at least one downstream wavelength path; and
a receiver, configured to receive upstream service data from the activated ONU using the first upstream wavelength path.

19. An optical network unit (ONU), comprising:
a receiver, configured to receive a first downstream frame from an optical line terminal (OLT) using at least one downstream wavelength path, wherein the OLT and the ONU communicate with each other using the at least one downstream wavelength path and a plurality of upstream wavelength paths, wherein the ONU is an activated ONU, wherein the first downstream frame comprises a first path identifier identifying a first upstream wavelength path, and wherein the first upstream wavelength path is one of the plurality of upstream wavelength paths, and selection of the first upstream wavelength path is independent of the at least one downstream wavelength path;
at least one processor;
a non-transitory computer readable memory connected to the at least one processor and storing a program for execution by the at least one processor, the program including instructions to:
determine the first upstream wavelength path based on the first path identifier; and
a transmitter, configured to send upstream service data to the OLT using the first upstream wavelength path.

20. A passive optical network system, comprising:
an optical line terminal (OLT); and
a plurality of optical network units (ONUs), wherein the OLT and an activated ONU of the plurality of ONUs communicate with each other using at least one downstream wavelength path and a plurality of upstream wavelength paths;
wherein the OLT comprises:
a transmitter configured to send a first downstream frame to an activated ONU using at least one downstream wavelength path, wherein the OLT and the activated ONU communicate with each other using the at least one downstream wavelength path and the plurality of upstream wavelength paths, wherein the first downstream frame comprises a first path identifier identifying a first upstream wavelength path, and wherein the first upstream wavelength path is one of the plurality of upstream wavelength paths, and the first upstream wavelength path is selected by the OLT independently of the at least one downstream wavelength path; and
a receiver configured to receive upstream service data from the activated ONU using the first upstream wavelength path; and
wherein the activated ONU comprises:
a receiver configured to receive the first downstream frame from the OLT using the at least one downstream wavelength path, wherein the OLT and the activated ONU communicate with each other using the at least one downstream wavelength path and the plurality of upstream wavelength paths;
at least one processor;
a non-transitory computer readable memory connected to the at least one processor and storing a program for execution by the at least one processor, the program including instructions to:
determine the first upstream wavelength path based on the first path identifier; and
a transmitter configured to send the upstream service data to the OLT using the first upstream wavelength path.

* * * * *

UNITED STATES PATENT AND TRADEMARK OFFICE
CERTIFICATE OF CORRECTION

PATENT NO. : 12,342,110 B2  
APPLICATION NO. : 17/730668  
DATED : June 24, 2025  
INVENTOR(S) : Wu et al.

Page 1 of 1

It is certified that error appears in the above-identified patent and that said Letters Patent is hereby corrected as shown below:

In the Specification

In Column 10, Line 40, delete "no," and insert -- 110, --.

In Column 10, Line 60, delete "no" and insert -- 110 --.

In Column 11, Line 34, delete "no" and insert -- 110 --.

In Column 12, Line 3, delete "ion" and insert -- 130n --.

In Column 13, Line 12, delete "Xndn" and insert -- λndn --.

Signed and Sealed this  
Twenty-ninth Day of July, 2025

Coke Morgan Stewart  
*Acting Director of the United States Patent and Trademark Office*